(12) United States Patent
Chakrabarti et al.

(10) Patent No.: US 12,417,422 B2
(45) Date of Patent: Sep. 16, 2025

(54) SYSTEMS AND METHODS TO OPTIMIZE WAREHOUSE OPERATIONS

(71) Applicant: Honeywell International Inc., Charlotte, NC (US)

(72) Inventors: Anish Chakrabarti, Cincinnati, OH (US); Garrett Rysko, Bellevue, WA (US); Akash Jain, Dallas, TX (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 193 days.

(21) Appl. No.: 18/061,080

(22) Filed: Dec. 2, 2022

(65) Prior Publication Data

US 2023/0401518 A1  Dec. 14, 2023

Related U.S. Application Data

(60) Provisional application No. 63/366,220, filed on Jun. 10, 2022.

(51) Int. Cl.
| | |
|---|---|
| *G06Q 10/00* | (2023.01) |
| *G06Q 10/0631* | (2023.01) |
| *G06Q 10/0639* | (2023.01) |
| *G06Q 10/08* | (2023.01) |

(52) U.S. Cl.
CPC ............ *G06Q 10/06398* (2013.01); *G06Q 10/063114* (2013.01); *G06Q 10/08* (2013.01)

(58) Field of Classification Search
None
See application file for complete search history.

(56) References Cited

U.S. PATENT DOCUMENTS

| | | | |
|---|---|---|---|
| 11,037,554 B1* | 6/2021 | Le Chevalier | G10L 15/16 |
| 11,715,042 B1* | 8/2023 | Liu | G06N 3/006 |
| | | | 705/26.1 |
| 2009/0089682 A1* | 4/2009 | Baier | G06Q 10/10 |
| | | | 715/751 |

(Continued)

OTHER PUBLICATIONS

C Duarte, B Acker, R Grosshans, M Manic (Prioritizing and visualizing energy management and control system data to provide actionable information for building operators)—Proc. of the 2011 . . . , 2011—academia.edu (Year: 2011).*

(Continued)

*Primary Examiner* — Hafiz A Kassim
(74) *Attorney, Agent, or Firm* — ALSTON & BIRD LLP

(57) ABSTRACT

A system configured to: receive a request to generate a dashboard visualization associated with one or more edge devices, the request comprising: a categorization of one or more of the edge devices; and at least one operational descriptor; and in response to the request: obtain, based on the categorization of the one or more edge devices and the operational descriptor, aggregated data associated with the one or more edge devices; determine a status associated with the one or more edge devices for the aggregated data; provide the dashboard visualization to an electronic interface of a computing device, the dashboard visualization comprising the status associated with the one or more edge devices, determine a list of prioritized actions for the one or more edge devices based on the status; and optimize a status of the one or more edge devices based on the determined list of prioritized actions.

17 Claims, 16 Drawing Sheets

(56) References Cited

U.S. PATENT DOCUMENTS

| | | | | |
|---|---|---|---|---|
| 2014/0121830 | A1* | 5/2014 | Gromley | G07G 1/01 |
| | | | | 700/236 |
| 2017/0006135 | A1* | 1/2017 | Siebel | H04L 67/566 |
| 2020/0118401 | A1* | 4/2020 | Zalewski | G07G 1/0072 |
| 2020/0310888 | A1* | 10/2020 | Gopalan | G06F 21/31 |
| 2020/0387851 | A1* | 12/2020 | de Oliveira | G06Q 10/06395 |
| 2021/0090193 | A1* | 3/2021 | Cui | G06Q 10/08 |
| 2022/0294816 | A1* | 9/2022 | Martin | H04L 67/535 |
| 2022/0309079 | A1* | 9/2022 | Kurniawan | H04L 12/12 |

OTHER PUBLICATIONS

JL Stănică, G Căruţaşu, A Pîrjan, C Coculescu (IoT cloud solution for efficient electricity consumption)—Journal of Information . . . , 2018—rau.ro (Year: 2018).*

* cited by examiner

SHIFT / AREA SUPERVISOR

ANALYTICAL ⟵—○—⟶ TACTICAL

RESPONSIBILITIES
- SUPERVISE ALL THE ACTIVITIES IN A PARTICULAR ZONE AS PER STANDARDS/ OPERATING POLICIES.
- DEVELOP AND SHARE BEST WAREHOUSE PRACTICES WITH TEAM MEMBERS.
- PROVIDE ASSISTANCE TO TEAM MEMBERS AND CONDUCT TRAININGS AS NEEDED.
- MONITOR TEAM PERFORMANCE AND PROVIDE FEEDBACK FOR IMPROVEMENTS.
- IDENTIFY APPROPRIATE RESOURCES, PERFORM DAILY WORKLOAD ASSIGNMENTS, AND MAKE STAFFING ADJUSTMENTS.
- DEVELOP CONTINUOUS IMPROVEMENT INITIATIVES TO ENSURE QUALITY, PRODUCTIVITY, AND SAFETY.

WORK ENVIRONMENT
- I NEED TO BE OUT ON THE FLOOR TO DO MY WORK EFFECTIVELY
- IT IS VERY NOISY AND THERE MAY BE EXTREME TEMPERATURES
- SOMETIMES I USE WALKIE TALKIES TO COMMUNICATE, BUT IT IS NOT VERY EFFECTIVE
- GETTING FROM ONE AREA TO ANOTHER MAY TAKE A LONG TIME BECAUSE OF THE SIZE OF THE BUILDING
- EXISTING PERFORMANCE TOOLS ARE BEST CONSUMED AT MY DESK WHICH IS FAR AWAY FROM MY TEAM AND THE WORK BEING DONE

TOOLS
- VMS/WES
- LMS
- TMS

DAY TO DAY TASKS
- OVERSEE WORKING EXECUTION OF DAILY "PLAN"
- CHECKING REPORTS TO ENSURE MAXIMUM PERFORMANCE THROUGHOUT THE SHIFT
- WORKING WITH THE PLANNING TEAM TO UNDERSTAND TODAY'S OUTPUT GOALS
- CHECKING WITH OPS MANAGER OR AREA SUPERVISORS FROM THE PREVIOUS SHIFT TO UNDERSTAND HOW AREAS ARE RUNNING
- WORKS WITH PLANNING TO UNDERSTAND THE OUTPUT GOALS OF THE SHIFT

WORKS WITH
- WORKERS
- OTHER SHIFT SUPERVISORS
- DC SITE OPERATIONS MANAGERS
- HR
- IT

PAIN POINTS
- CHECKING REPORTS THROUGHOUT THE DAY
- MY TEAM MAY CONSIST OF MOSTLY UNSKILLED OR TEMPORARY LABORERS
- DON'T HAVE ACCESS TO UP TO DATE DATA
- I CONSTANTLY WALK BACK AND FORTH FROM THE OFFICE TO THE FLOOR TO GET INFO ABOUT KPIS
- I HAVE TO USE 4 DIFFERENT SYSTEMS/MONITORS TO GET DATA I NEED
- THERE IS NO CLEAR STRUCTURE OF WHO OWNS TASKS/PROBLEMS; COMMUNICATION IS POOR

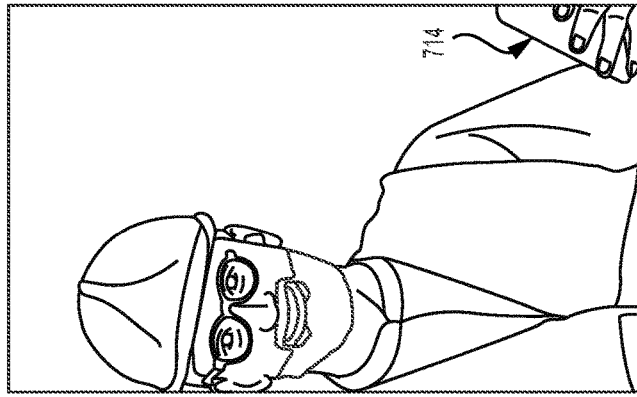

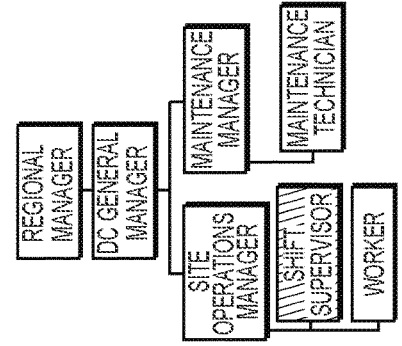

*FIG. 7*

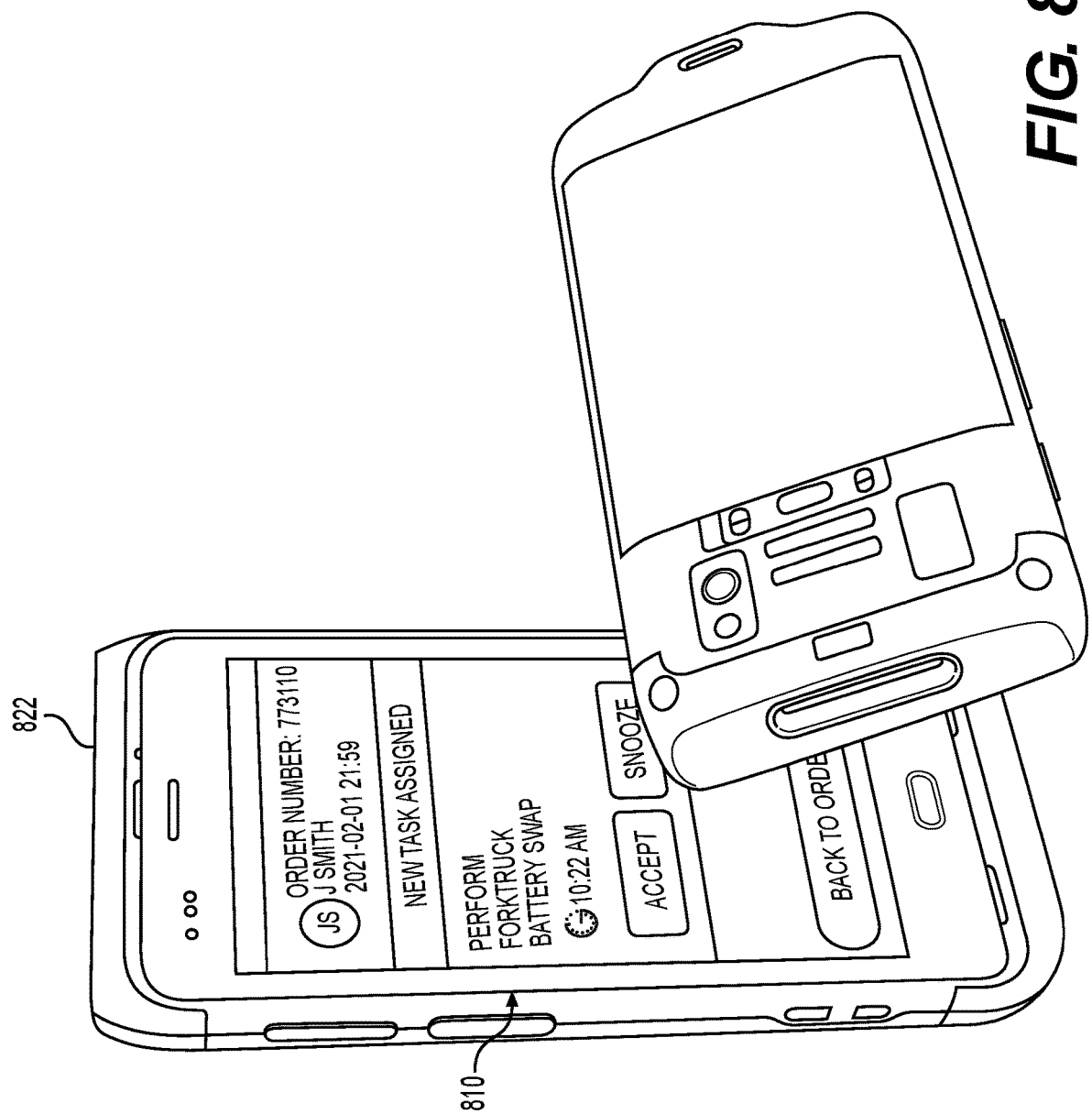

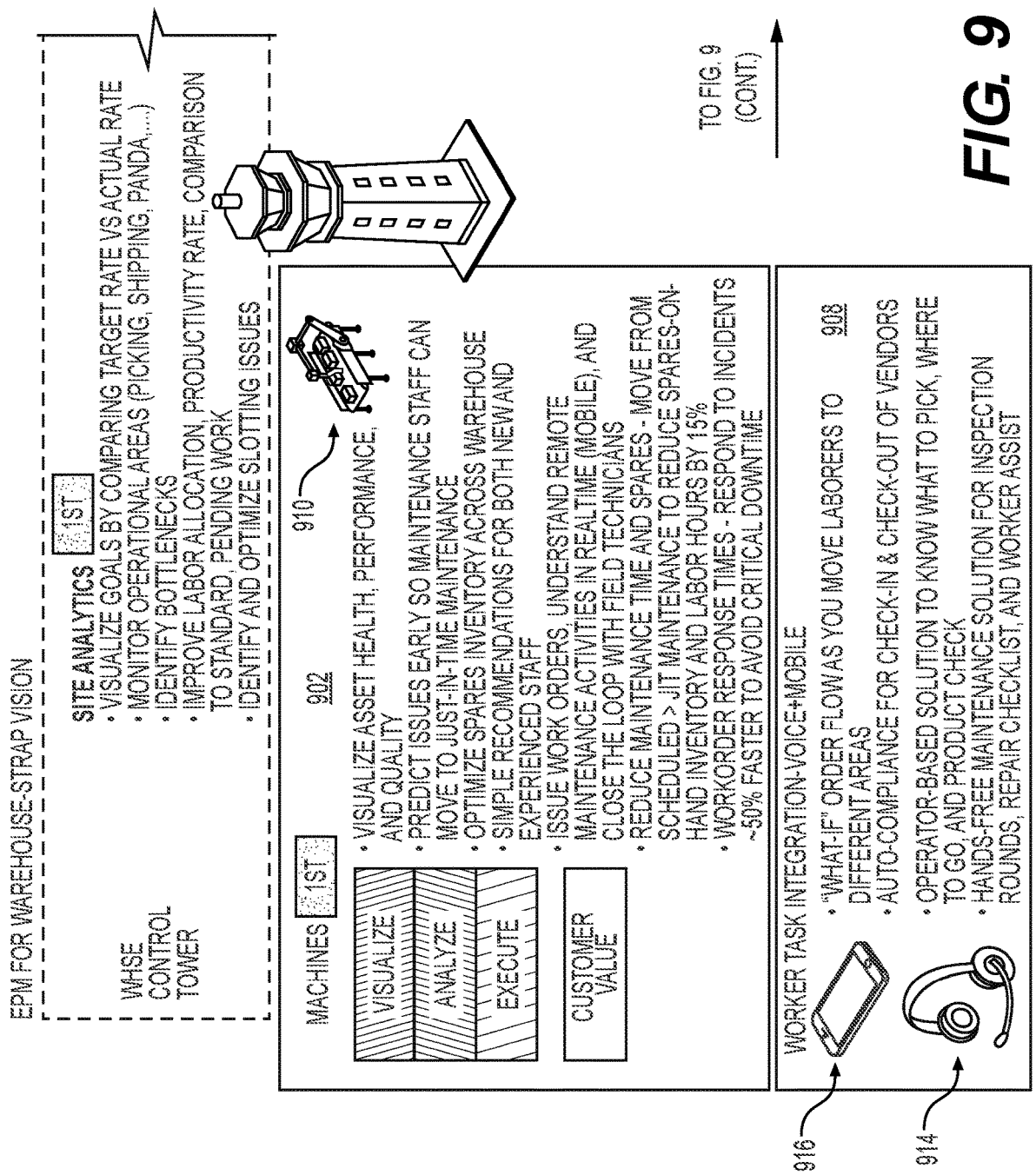

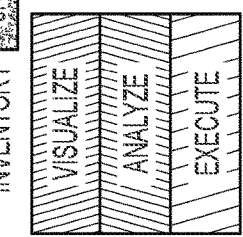

FIG. 9 (CONT.)

FROM FIG. 9

MAKE EVERY SHIFT YOUR BEST WITH THE RIGHT WORKERS, PERFORMANCE, EQUIPMENT, AND OPTIMALLY PLACED INVENTORY.

PORTFOLIO BENCHMARKING & COMPARISONS [2ND]
- COMPARE "COST PER CASE SHIPPED"
- COMPARE INBOUND EFFICIENCY AND PREDICTED TRENDS
- OPTIMIZE OUTBOUND EFFICIENCY AND THROUGHPUT
- COMPARE & REDUCE INVENTORY COSTS
- COMPARE & REDUCE LABOR COST
- REDUCE DOWNTIME AND IDENTIFY REPETITIVE ISSUES

INVENTORY [3RD]  906  912
- SHOW ORDER UTILIZATION FOR EACH AREA & ASSET
- VISUALIZE REPLENISHMENT AND SHIPPING CUT-OFF TIMES
- UNDERSTAND WHICH ORDERS I SHOULD RELEASE AND WHEN
- PROVIDE SLOTTING RECOMMENDATIONS AND NOTIFICATIONS FOR POSSIBLE STOCK-OUT CONDITIONS BASED ON EXPECTED VOLUME
- NOTIFY WHEN ORDERS ARE IN JEOPARDY OF MISSING CUT-OFF TIMES
- IDENTIFY IDEAL INVENTORY LEVELS BASED ON HISTORIC PERFORMANCE TO REDUCE THE 20% OF DC OPERATION COST TIED-UP IN INVENTORY
- INCREASE CUSTOMER SATISFACTION BY MAINTAINING PROMISE DATE
- INCREASE REPLENISHMENT EFFICIENCY WITH UPDATED TRAILER ARRIVAL TIMES

VISUALIZE | ANALYZE | EXECUTE

CUSTOMER VALUE

LABOR [2ND]  904  915
- WHERE ARE STAFF ARE WORKING IN THE WAREHOUSE TODAY?
- UNDERSTAND THE BEST AREA LABOR SHOULD MOVE TO
- BENCHMARK AND UNDERSTAND THE EFFICIENCY OF LABORERS ON THE BEST DAY, VERSUS TODAY
- PROVIDE LABOR ALLOCATION PLANS FOR OPS MANAGEMENT TO EXECUTE
- 50%-70% OF WAREHOUSE COST ATTRIBUTED TO LABOR
- CAPACITY SMOOTHING - REDUCE IDLE EMPLOYEES BY 2%-3% MOVING THEIR WORK TO THE RELEVANT AREA OF THE WAREHOUSE
- EMPLOYEE TURNOVER - REDUCE EMPLOYEE TURNOVER (10%) AS WELL AS REDUCE RAMPUP COSTS (30%) OF NEW EMPLOYEES

VISUALIZE | ANALYZE | EXECUTE

CUSTOMER VALUE

FIG. 10

SYSTEMS AND METHODS TO OPTIMIZE WAREHOUSE OPERATIONS

CROSS REFERENCE TO RELATED APPLICATIONS

This application claims the benefit of priority under 35 U.S.C. § 119 from U.S. Provisional Patent Application No. 63/366,220, filed on Jun. 10, 2022, the contents of which are incorporated by reference in their entirety.

TECHNICAL FIELD

The present disclosure relates generally to methods and systems to optimize operations in a workplace such as a warehouse or distribution center.

BACKGROUND

Warehouses and distribution centers where employees are often engaged in a multitude of tasks can benefit from receiving real time and historical data from other sources. Further, overall operations can benefit from transmitting real time and historical data to optimize employee operations. Data patterns and trends can be determined from the received data, and the recipient can utilize the data patterns and trends to perform meaningful actions. In practice, employee task optimization is often lacking since a significant amount of optimization benefits have remained unreachable. Therefore, there is a need for a system for collecting and analyzing real-time data from employees, and also for sharing critical data through a streamlined communication network.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a system for monitoring performance of a warehouse, includes one or more processors; a memory, comprising one or more programs stored in the memory, the one or more programs comprising instructions configured to: receive a request to generate a dashboard visualization associated with one or more edge devices, the request comprising: a categorization of one or more of the edge devices; and at least one operational descriptor; and in response to the request: obtain, based on the categorization of the one or more edge devices and the operational descriptor, aggregated data associated with the one or more edge devices; determine a status associated with the one or more edge devices for the aggregated data; provide the dashboard visualization to an electronic interface of a computing device, the dashboard visualization comprising the status associated with the one or more edge devices, determine a list of prioritized actions for the one or more edge devices based on the status; and optimize a status of the one or more edge devices based on the determined list of prioritized actions.

In another embodiment, a method of monitoring performance of one or more a warehouses includes receiving a request to generate a dashboard visualization associated with one or more edge devices, the request comprising: a categorization of one or more of the edge devices; and at least one operational descriptor; and in response to the request; obtain, based on the categorization of the one or more edge devices and the operational descriptor, aggregated data associated with the one or more edge devices; determine a status associated with the one or more edge devices for the aggregated data; and provide the dashboard visualization to an electronic interface of a computing device, the dashboard visualization comprising the status associated with the one or more edge devices.

In yet another embodiment, a system includes at least one warehouse, each at least one warehouse including a plurality of edge devices configured to access a network; and a computing device including: a display; one or more processors; a memory including one or more programs stored therein, which, when executed by the one or more processors, cause the computing device to: receive, from the plurality of edge devices, aggregated data associated with the plurality of edge devices; determine prioritized actions associated with the plurality of edge devices for the aggregated data; and provide a dashboard visualization to the display, the dashboard visualization comprising the prioritized actions associated with a portfolio of assets, determine a list of prioritized actions for the one or more edge devices based on the status; and optimize a status of the one or more edge devices based on the determined list of prioritized actions, wherein the visualization is based on one or more of: a categorization of one or more of the edge devices; and at least one operational descriptor.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which:

FIG. 7 illustrates an exemplary shift supervisor who may implement methods and systems of this disclosure;

FIG. 8 illustrates an exemplary user interface dashboard in a first mode, in accordance with one or more embodiments described herein;

FIG. 9 illustrates an exemplary dashboard for displaying information including recommendations to a user, in accordance with one or more embodiments described herein;

FIG. 10 illustrates another exemplary electronic interface, in accordance with one or more embodiments described herein;

DETAILED DESCRIPTION

Figure 1:
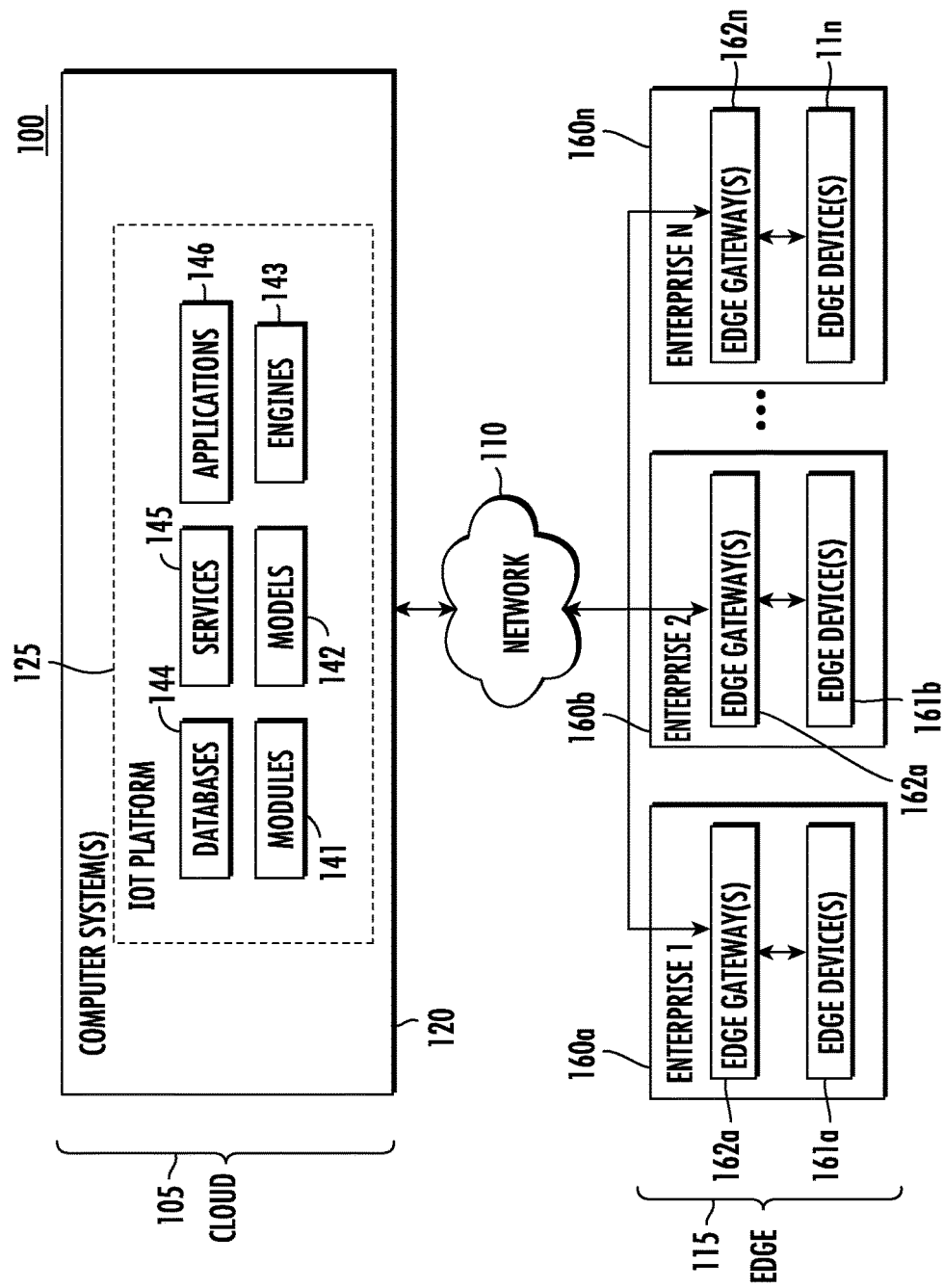
FIG. 1 illustrates an exemplary networked computing system environment, in accordance with one or more embodiments described herein.

The following embodiments describe systems and methods for facilitating a connected warehouse as between employees, managers, and other users as well as inter- and intra-warehouse edge communications systems.

Current tools for monitoring warehouse operations may require users to extract data and generate insights from separate systems with disconnected interfaces and non-communicating components. Disaggregated, stovepiped systems must be routinely monitored and the data they create must be analyzed separately by users and then aggregated manually in order to fully optimize warehouse operations. This disjointed system architecture can lead to inefficiencies and overall suboptimal warehouse operations.

A dynamic and decentralized system and methods for implementing a connected warehouse system is provided. An embodiment or implementation described herein as "dynamic" is intended to reflect or indicate that the embodiment(s) is or can be marked by continuous and productive activity or change, though not necessarily constantly changing. The system and corresponding techniques facilitate communications within a warehouse, between users (e.g., worker, teams of workers, manager, etc.), and between warehouses, third parties associated therewith, and data centers. Such communications may be facilitated by edge systems and gateway systems. The edge and gateway systems may be located in warehouses (i.e., on-site) as embedded or fixed systems and/or other user devices such as tablet PCs and mobile phones. Each edge system may be coupled to a warehouse system from which warehouse operations data may be collected, and in communication with other edge systems and gateway systems. Each gateway system may be in communication with warehouse operation systems and edge systems of the warehouse in which the gateway system is resident, and may also be in communication with gateway systems located in other warehouses, all or some of which may provide data to the gateway system. By facilitating communication with gateway systems located in other warehouses, the gateway system may enable exchange of data among edge systems installed in different warehouses. Independent user computing devices, such as tablet PCs and mobile phones, may be directly coupled to and/or in communication with the edge systems and/or gateway systems, to request, filter, view, and/or analyze data.

Hardware for all or some of the edge systems and gateway systems may be installed in warehouses. Therefore, software may be installed on the corresponding warehouse hardware. The software implemented in the edge systems and gateway systems may comprise computer-executable code for performing various data functions, including but not limited to, data request, data query, data retrieval, data transmission, and data analytics. The edge systems and gateway systems each identify source(s) of relevant data, and request that data be provided dynamically (as needed) or statically (all the time) from the identified source(s), such as from other edge systems coupled to warehouse systems in the warehouse or other warehouses, gateway systems in the warehouse or other warehouses, decentralized system(s) such as cloud computing center(s), and centralized system(s) such as dedicated server farms. The decentralized system(s) and centralized system(s) may be owned by the operators of the warehouses, or by a third party such as a government or a commercial entity.

Each edge system in a warehouse may be coupled to a sensor of a corresponding warehouse system in the same warehouse, enabling data captured by the sensor to be provided directly to the edge system. Also, a gateway system in a warehouse may be coupled to one or more sensors of warehouse systems in the same warehouse, enabling data captured by the one or more sensors to be provided directly to the gateway system. In another embodiment, each edge system in a warehouse may be coupled to warehouse system of a corresponding warehouse system in the same warehouse. Also, a gateway system in a warehouse may be coupled to warehouse system machines of warehouse systems in the same warehouse. In some aspects, warehouse system machines may be configured to collect data from the coupled one or more sensors, perform computations and/or analysis of the collected data, store the collected and/or analyzed data in memory, and provide the collected and/or analyzed data to one or more connected edge systems and/or gateway system. In some embodiments, the warehouse system may not be implemented, or may not be coupled to the one or more sensors of the warehouse system. If the warehouse system machine is not implemented or not coupled to the one or more sensors, data captured by the one or more sensors may be provided directly to the one or more connected edge systems and/or gateway system.

Each warehouse system may be in communication with, through an edge system or not, a gateway system. Edge systems in a warehouse may be in direct communication with one another. For example, any data retained by one edge system may be transmitted directly to another edge system within the same warehouse, without a gateway system acting as an intermediary. In another embodiment, an edge system may send to or receive data from another edge system located in the same warehouse through a gateway system. The communication between the edge systems and the communication between the edge systems and the gateway system may be through a wired or wireless connection.

A gateway system of a warehouse may be in communication with gateway systems of other warehouses. Through this communication path, an edge system or a gateway system of a warehouse may transmit data to and obtain data from edge systems or gateway systems of other warehouses. The communication path between gateway systems of different warehouses may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed. An edge system in a warehouse may communicate with another edge system in a different warehouse via gateway systems of the respective warehouses. For example, an edge system in a warehouse may transmit data to one or more edge systems in other warehouses via the gateway systems of the respective warehouses communicating over the communication path discussed above.

Each edge system and gateway system may comprise state machines, such as processor(s) coupled to memory. Both the edge systems and the gateway systems may be configured with a common operating system to support portable, system-wide edge software implementations. In other words, each of the edge systems and the gateway systems may be equipped with standard software to facilitate inter-operability among the edge systems and the gateway systems. In the discussion below, such software will be referred to as edge software. The edge software may enable each edge system or gateway system to perform various functions listed below (non-exhaustive) to enable data analysis and data exchange among the various systems illustrated herein (e.g., edge systems, gateway systems, warehouse operations centers, remote systems):

- Filter and analyze real-time and stored data collected from other edge systems, warehouse systems, gateway systems, and/or operations center(s), and generate events based on the analysis;
- Identify dynamic (i.e., as needed) and static (i.e., all the time) data transmission targets (e.g., edge systems within the same warehouse, edge systems in other warehouses, operations center(s));
- Transmit data over an Internet connection to the operations centers;
- Transmit data and events to other edge and gateway systems within an aircraft that are connected over wired/wireless networks, or to other edge and gateway systems external to the aircraft that are connected over the Internet;
- Provide a request/response interface for other edge/gateway systems, warehouse borne computer systems, operations centers, and remote systems connected over wired/wireless networks or Internet to query the stored data and to dynamically select/change data filters;
- Use request/response interfaces provided by other edge systems, gateway systems, and operations centers connected over wired/wireless networks or Internet to obtain data and to dynamically select/change data filters;
- Receive events from other edge systems, gateway systems, and operations centers; and
- Specify and communicate generic purposes (i.e., types of data the edge/gateway system is interested in) to other edge systems, gateway systems, and operations centers.

Each edge system or gateway system may autonomously select and deliver data to one or more transmission targets, which may be other edge systems in the same warehouse, edge systems in other warehouses, gateway system in the same warehouse, gateway systems in other warehouses, or operations center(s). Each of the receiving edge or gateway systems (i.e., transmission targets) may be configured to filter the received data using a pre-defined filter, overriding the autonomous determination made by the edge system transmitting the data. In some embodiment, each receiving edge or gateway system may notify the other systems, in advance of the data transmission, of the types of data and/or analysis the receiving system wants to receive (i.e., generic "purposes"). Also, each edge or gateway system may maintain a list including static data transmission targets (transmission targets that always need the data) and dynamic data transmission targets (transmission targets that need the data on as-needed basis).

A gateway system of a warehouse may also be in communication with one or more operations centers, which may be located remotely from the warehouse (i.e., off-site). In some embodiments, however, the operations center(s) may be located on-site at the warehouse. Each of the warehouse systems of this disclosure may be implemented in a dedicated location, such as a server system, or may be implemented in a decentralized manner, for example, as part of a cloud system. The communication path between the gateway systems and the operations center(s) may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). Furthermore, the method presented in the drawings and the specification is not to be construed as limiting the order in which the individual steps may be performed. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" or "in some embodiments" as used herein does not necessarily refer to a different embodiment. It is intended, for example, that claimed subject matter include combinations of exemplary embodiments in whole or in part.

FIG. 1 illustrates an exemplary networked computing system environment 100, according to the present disclosure. As shown in FIG. 1, networked computing system environment 100 is organized into a plurality of layers including a cloud 105, a network 110, and an edge 115. As detailed further below, components of the edge 115 are in communication with components of the cloud 105 via network 110.

In various embodiments, network 110 is any suitable network or combination of networks and supports any appropriate protocol suitable for communication of data to and from the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160*a*-160*n* each including one or more edge devices 161*a*-161*n* and one or more edge gateways 162*a*-162*n*. For example, a first enterprise 160*a* includes first edge devices 161*a* and first edge gateways 162*a*, a second enterprise 160*b* includes second edge devices 161*b* and second edge gateways 162*b*, and an nth enterprise 160*n* includes nth edge devices 161*n* and nth edge gateways 162*n*. As used herein, enterprises 160*a*-160*n* represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

According to various embodiments, the edge devices 161*a*-161*n* represent any of a variety of different types or categories of devices that may be found within the enterprises 160*a*-160*n*. Edge devices 161*a*-161*n* are any type of device configured to access network 110, or be accessed by other devices through network 110, such as via an edge gateway 162*a*-162*n*. According to various embodiments, edge devices 161*a*-161*n* are "IoT devices" which include any type of network-connected (e.g., Internet-connected) device. For example, in one or more embodiments, the edge devices 161*a*-161*n* include assets, sensors, actuators, processors, computers, valves, pumps, ducts, vehicle components, cameras, displays, doors, windows, security components, boilers, chillers, pumps, HVAC components, factory equipment, and/or any other devices that are connected to the network 110 for collecting, sending, and/or receiving information. Each edge device 161*a*-161*n* includes, or is otherwise in communication with, one or more controllers for selectively controlling a respective edge device 161*a*-161*n* and/or for sending/receiving information between the edge devices 161*a*-161*n* and the cloud 105 via network 110. A categorization of the edge device 161*a*-161*n* may be used as input to a dashboard visualization to provide information and/or recommendations to a user of the systems described herein.

Figure 2:
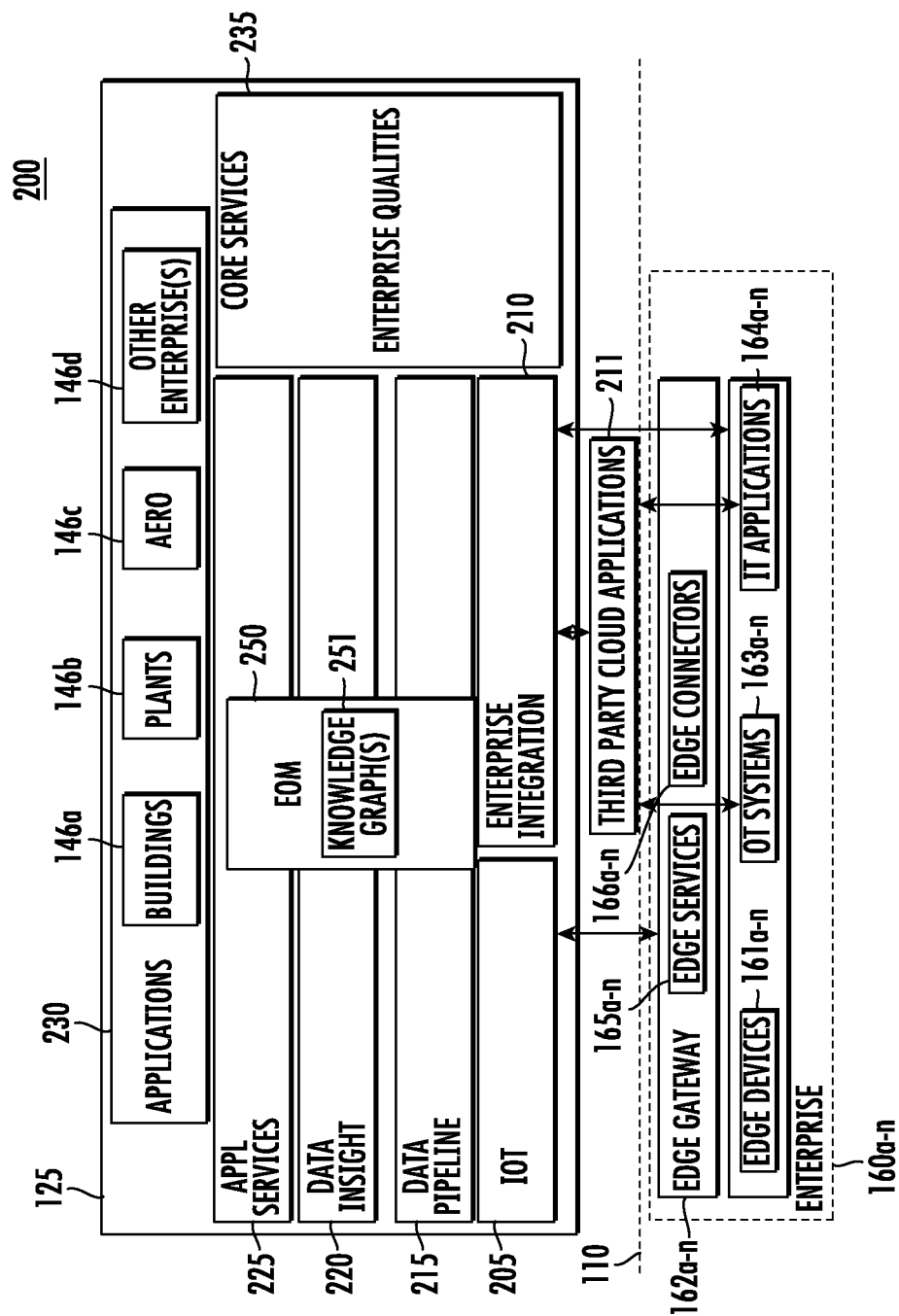
FIG. 2 illustrates a schematic block diagram of a framework of an IoT platform of the networked computing system, in accordance with one or more embodiments described herein.

With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n, for example, to a regional manager of the enterprise. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, the extensible object model 250 communicates with each layer 205-230 to contextualize site data of the enterprise 160a-160n using an extensible graph based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior. In one or more embodiments, each of the key attributes contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 251 receives "TMP" during the modeling phase and determine that "TMP" relates to "temperature." The generated models are then published. The complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT layer 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third party cloud applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services layer 235 include data visualization, data analytics tools, security, scaling, and monitoring. According to various embodiments, the core services layer 235 also include services for tenant provisioning, single login/common portal, self-service admin, UI library/UI tiles, identity/access/entitlements, logging/monitoring, usage metering, API gateway/dev portal, and the IoT platform 125 streams.

Figure 3:
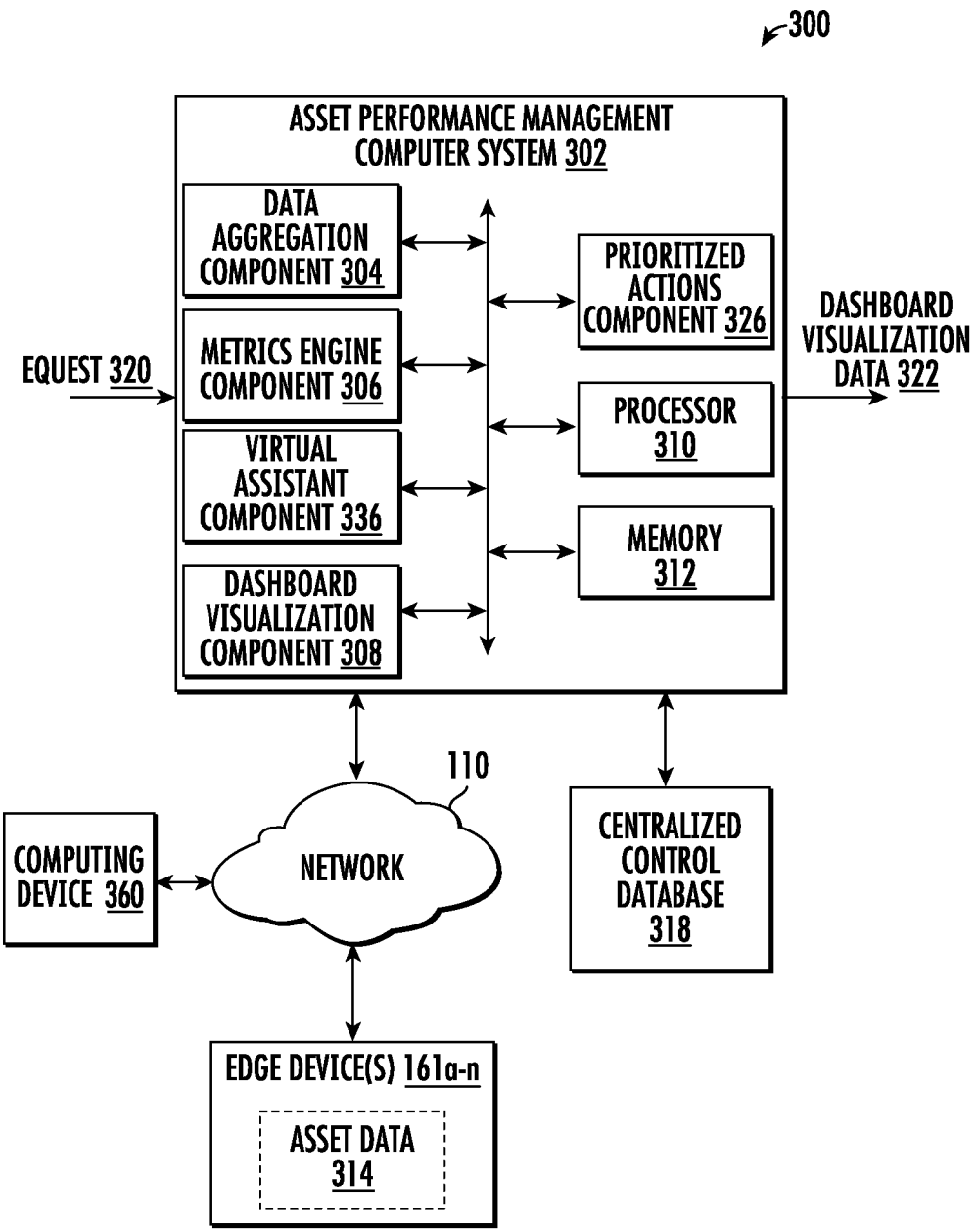
FIG. 3 illustrates a system that provides an exemplary environment, in accordance with one or more embodiments described herein.

FIG. 3 illustrates a system 300 that provides an exemplary environment according to one or more described features of one or more embodiments of the disclosure. According to an embodiment, the system 300 includes an asset performance management computer system 302 to facilitate a practical application of data analytics technology and/or digital transformation technology to provide optimization related to enterprise performance management. In one or more embodiments, the asset performance management computer system 302 facilitates a practical application of metrics modeling and/or dynamic cache storage related to dashboard technology to provide optimization related to enterprise performance management. In one or more embodiments, the asset performance management computer system 302 stores and/or analyzes data that is aggregated from one or more assets and/or one or more data sources associated with an enterprise system (e.g., a building system, an industrial system or another type of enterprise system). In one or more embodiments, the asset performance management computer system 302 facilitates a practical application of a virtual assistant related to dashboard technology to provide optimization related to enterprise performance management. In one or more embodiments, the asset performance management computer system 302 employs artificial intelligence to provide the practical application of a virtual assistant related to dashboard technology to provide optimization related to enterprise performance management.

In an embodiment, the asset performance management computer system 302 is a server system (e.g., a server device) that facilitates a data analytics platform between one or more computing devices, one or more data sources, and/or one or more assets. In one or more embodiments, the asset performance management computer system 302 is a device with one or more processors and a memory. In one or more embodiments, the asset performance management computer system 302 is a computer system from the computer systems 120. For example, in one or more embodiments, the asset performance management computer system 302 is implemented via the cloud 105. The asset performance management computer system 302 is also related to one or more technologies, such as, for example, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

Moreover, the asset performance management computer system 302 provides an improvement to one or more technologies such as enterprise technologies, connected building technologies, industrial technologies, IoT technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies. In an implementation, the asset performance management computer system 302 improves performance of a computing device. For example, in one or more embodiments, the asset performance management computer system 302 improves processing efficiency of a computing device (e.g., a server), reduces power consumption of a computing device (e.g., a server), improves quality of data provided by a computing device (e.g., a server), etc.

The asset performance management computer system 302 includes a data aggregation component 304, a metrics engine component 306, a prioritized actions component 326, a virtual assistant component 336, and/or a dashboard visualization component 308. Additionally, in one or more embodiments, the asset performance management computer system 302 includes a processor 310 and/or a memory 312. In certain embodiments, one or more aspects of the asset performance management computer system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the asset performance management computer system 302, a remote processor (e.g., a processor implemented on a server), and/or a virtual machine. In certain embodiments, the processor 310 is in communication with the memory 312, the data aggregation component 304, the metrics engine component 306, the prioritized actions component 326, the virtual assistant component 336 and/or the dashboard visualization component 308 via a bus to, for example, facilitate transmission of data among the processor 310, the memory 312, the data aggregation component 304, the metrics engine component 306, the prioritized actions component 326, the virtual assistant component 336 and/or the dashboard visualization component 308. The processor 310 may be embodied in a number of different ways and, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the asset performance management computer system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the asset performance management computer system 302 (e.g., the data aggregation component 304 of the asset performance management computer system 302) receives asset data 314 from the edge devices 161a-161n. In one or more embodiments, the edge devices 161a-161n are associated with a portfolio of assets. For instance, in one or more embodiments, the edge devices 161a-161n include one or more assets in a portfolio of assets. The edge devices 161a-161n include, in one or more embodiments, one or more databases, one or more assets (e.g., one or more building assets, one or more industrial assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and the asset performance management computer system 302 via the network 110. The asset data 314 includes, for example, industrial data, connected building data, sensor data, real-time data, historical data, event data, process data, location data, and/or other data associated with the edge devices 161a-161n.

In certain embodiments, at least one edge device from the edge devices 161a-161n incorporates encryption capabilities to facilitate encryption of one or more portions of the asset data 314. Additionally, in one or more embodiments, the asset performance management computer system 302 (e.g., the data aggregation component 304 of the asset performance management computer system 302) receives the asset data 314 via the network 110. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

In one or more embodiments, the data aggregation component 304 aggregates the asset data 314 from the edge devices 161a-161n. For instance, in one or more embodiments, the data aggregation component 304 aggregates the asset data 314 into a centralized control database 318 configured as a database structure. The centralized control database 318 is a cache memory (e.g., a dynamic cache) that dynamically stores the asset data 314 based on interval of time and/or asset hierarchy level. For instance, in one or more embodiments, the centralized control database 318 stores the asset data 314 for one or more intervals of time (e.g., 1 minute to 12 minutes, 1 hour to 24 hours, 1 day to 31 days, 1 month to 12 months, etc.) and/or for one or more asset hierarchy levels (e.g., asset level, asset zone, building level, building zone, plant level, plant zone, industrial site level, etc.). In a non-limiting embodiment, the centralized control database 318 stores the asset data 314 for a first interval of time (e.g., 1 hour to 24 hours minutes) for a first asset (e.g., a first asset hierarchy level), for a second interval of time (e.g., 1 day to 31 days) for the first asset, and for a third interval of time (e.g., 1 month to 12 months) for the first asset.

In an example embodiment, the centralized control database 318 stores the asset data 314 for the first interval of time (e.g., 1 hour to 24 hours minutes) for all assets in a connected building (e.g., a second asset hierarchy level), for the second interval of time (e.g., 1 day to 31 days) for all the assets in the connected building, and for the third interval of time (e.g., 1 month to 12 months) for the all the assets in the connected building. In the example embodiment, the centralized control database 318 also stores the asset data 314 for the first interval of time (e.g., 1 hour to 24 hours minutes) for all connected buildings within a particular geographic region (e.g., a third asset hierarchy level), for the second interval of time (e.g., 1 day to 31 days) for all connected buildings within the particular geographic region, and for the third interval of time (e.g., 1 month to 12 months) for all connected buildings within the particular geographic region.

In another example embodiment, the centralized control database 318 stores the asset data 314 for the first interval of time (e.g., 1 hour to 24 hours minutes) for all assets in a plant (e.g., a second asset hierarchy level), for the second interval of time (e.g., 1 day to 31 days) for all the assets in the plant, and for the third interval of time (e.g., 1 month to 12 months) for the all the assets in the plant. In the example embodiment, the centralized control database 318 also stores the asset data 314 for the first interval of time (e.g., 1 hour to 24 hours minutes) for all plants at an industrial site (e.g., a third asset hierarchy level), for the second interval of time (e.g., 1 day to 31 days) for all plants at the industrial site, and for the third interval of time (e.g., 1 month to 12 months) for all plants at the industrial site.

In one or more embodiments, the data aggregation component 304 repeatedly updates data of the centralized control database 318 based on the asset data 314 provided by the edge devices 161a-161n during the one or more intervals of time associated with the centralized control database 318. For instance, in one or more embodiments, the data aggregation component 304 stores new data and/or modified data associated with the asset data 314. In one or more embodiments, the data aggregation component 304 repeatedly scans the edge devices 161a-161n to determine new data for storage in the centralized control database 318. In one or more embodiments, the data aggregation component 304 formats one or more portions of the asset data 314. For instance, in one or more embodiments, the data aggregation component 304 provides a formatted version of the asset data 314 to the centralized control database 318. In an embodiment, the formatted version of the asset data 314 is formatted with one or more defined formats associated with the one or more intervals of time and/or the one or more asset hierarchy levels. A defined format is, for example, a structure for data fields of the centralized control database 318. In various embodiments, the formatted version of the asset data 314 is stored in the centralized control database 318.

In one or more embodiments, the data aggregation component 304 identifies and/or groups data types associated with the asset data 314 based on the one or more intervals of time (e.g., one or more reporting intervals of time) and/or the one or more asset hierarchy levels. In one or more embodiments, the data aggregation component 304 employs batching, concatenation of the asset data 314, identification of data types, merging of the asset data 314, grouping of the asset data 314, reading of the asset data 314 and/or writing of the asset data 314 to facilitate storage of the asset data 314 within the centralized control database 318. In one or more embodiments, the data aggregation component 304 groups data from the asset data 314 based on corresponding features and/or attributes of the data. In one or more embodiments, the data aggregation component 304 groups data from the asset data 314 based on corresponding identifiers (e.g., a matching asset hierarchy level, a matching asset, a matching connected building, etc.) for the asset data 314. In one or more embodiments, the data aggregation component 304 employs one or more locality-sensitive hashing techniques to group data from the asset data 314 based on similarity scores and/or calculated distances between different data in the asset data 314.

In one or more embodiments, the data aggregation component 304 organizes the formatted version of the asset data 314 based on a time series mapping of attributes for the asset data 314. For instance, in one or more embodiments, the data aggregation component 304 employs a hierarchical data format technique to organize the formatted version of the asset data 314 in the centralized control database 318. In one or more embodiments, the centralized control database 318 dynamically stores data (e.g., one or more portions of the asset data 314) based on type of data presented via a dashboard visualization. In one or more embodiments, data (e.g., one or more portions of the asset data 314) aggregated from the edge devices 161a-161n is converted into one or more metrics (e.g., a KPI metric, a duty KPI, a duty target KPI) prior to being stored in the centralized control database 318. In one or more embodiments, a metric (e.g. a KP metrics) consists of aspect data indicative of an aspect employed in a model to map an attribute to the metric (e.g., an operating power asset type attribute is mapped to a duty aspect, etc.), aggregation data indicative of information related to aggregation across time, rollup data indicative of an aggregate metric of an asset across an asset at one level as well as across a hierarchy asset, low limit data indicative of a low-limit constant derived from a digital twin model in real-time, high limit data indicative of a high-limit constant derived from a digital twin model in real-time, target data indicative of a target constant derived from a digital twin model in real-time, custom calculation data indicative of information related to custom calculations using aggregate data across time or asset, and/or other data related to the metric.

In one or more embodiments, the asset performance management computer system 302 (e.g., the prioritized actions component 326 of the asset performance management computer system 302) receives a request 320. In an embodiment, the request 320 is a request to generate a dashboard visualization associated with a portfolio of assets. For instance, in one or more embodiments, the request 320 is a request to generate a dashboard visualization associated with the edge devices 161a-161n (e.g., the edge devices 161a-161n included in a portfolio of assets).

In one or more embodiments, the request 320 includes one or more asset descriptors that describe one or more assets in the portfolio of assets. For instance, in one or more embodiments, the request 320 includes one or more asset descriptors that describe the edge devices 161a-161n. An asset descriptor includes, for example, an asset name, an asset identifier, an asset level and/or other information associated with an asset. Additionally or alternatively, in one or more embodiments, the request 320 includes one or more user identifiers describing a user role for a user associated with access of a dashboard visualization. A user identifier includes, for example, an identifier for a user role name (e.g., a manager, an executive, a maintenance engineer, a process engineer, etc.). Additionally or alternatively, in one or more embodiments, the request 320 includes one or more metrics context identifiers describing context for the metrics. A metrics context identifier includes, for example, an identifier for a plant performance metric, an asset performance metric, a goal (e.g., review production related to one or more assets, etc.). Additionally or alternatively, in one or more embodiments, the request 320 includes one or more time interval identifier describing an interval of time for the metrics. A time interval identifier describes, for example, an interval of time for aggregated data such as hourly, daily, monthly, yearly etc. In one or more embodiments, a time interval identifier is a reporting time identifier describing an interval of time for the metrics.

In one or more embodiments, the request 320 is a voice input. In an embodiment, the voice input includes and/or initiates a request to generate a dashboard visualization associated with the portfolio of assets. For instance, in one or more embodiments, the voice input includes and/or initiates a request to generate a dashboard visualization associated with the edge devices 161a-161n (e.g., the edge devices 161a-161n included in a portfolio of assets). In one or more embodiments, the voice input comprises voice input data associated with the request to generate the dashboard visualization. For example, in one or more embodiments, the voice input data associated with the voice input comprises one or more asset insight requests associated with the portfolio of assets. In an embodiment, the one or more asset insight requests include a phrase provided via the voice input data. In another embodiment, the one or more asset insight requests include a question provided via the voice input data. For instance, in an embodiment, a user can speak a phrase or a question via a computing device to provide the voice input data associated with the voice input.

In one or more embodiments, the voice input includes one or more attributes (e.g., asset insight attributes, a metrics context identifier, etc.) associated with the one or more asset insight requests. For instance, in one or more embodiments, the voice input includes, for example, an identifier for a plant performance metric, an asset performance metric indicator, a goal indicator, etc. In an example, for a phrase "What was the production and quality of product A?", the word "production" can be a first attribute and the word "quality" can be a second attribute. In one or more embodiments, the voice input additionally or alternatively includes one or more asset descriptors that describe one or more assets in the portfolio of assets. For instance, in one or more embodiments, the voice input additionally or alternatively includes one or more asset descriptors that describe the edge devices 161a-161n. An asset descriptor includes, for example, an asset name, an asset identifier, an asset level and/or other information associated with an asset. Additionally or alternatively, in one or more embodiments, the voice input includes the one or more user identifiers describing a user role for a user associated with access of a dashboard visualization. Additionally or alternatively, in one or more embodiments, the voice input includes time data describing a time and/or an interval of time for the metrics and/or one or more asset insights.

In one or more embodiments, in response to the request 320, the metrics engine component 306 determines one or more metrics for an asset hierarchy associated with the portfolio of assets. For instance, in one or more embodiments, the metrics engine component 306 determines one or more metrics for an asset hierarchy associated with the edge devices 161a-161n in response to the request 320. In one or more embodiments, the metrics engine component 306 converts a portion of the asset data 314 into a metric for the portion of the asset data 314 and stores the metric for the portion of the asset data 314 into the centralized control database 318. In one or more embodiments, the metrics engine component 306 determines the one or more metrics for the asset hierarchy based on a model related to a time series mapping of attributes for the asset data 314. For example, in one or more embodiments, the metrics engine component 306 determines the one or more metrics for the asset hierarchy based on time series mapping of attributes for the asset data 314 with respect to the centralized control database 318.

In one or more embodiments, in response to the request 320, the prioritized actions component 326 determines prioritized actions for the portfolio of assets based on attributes for the aggregated data stored in the centralized control database 318. In an embodiment, the prioritized actions indicate which assets from the portfolio of assets should be serviced first. For example, in an embodiment, the prioritized actions indicate a first asset from the portfolio of assets that should be serviced first, a second asset from the portfolio of assets that should be serviced second, a third asset from the portfolio of assets that should be serviced third, etc. In one or more embodiments, the prioritized actions is a list of prioritized actions for the portfolio of assets based on impact to the portfolio. For instance, in one or more embodiments, the prioritized actions component 326 ranks, based on impact of respective prioritized actions with respect to the portfolio of assets, the prioritized actions to generate the list of the prioritized actions. In one or more embodiments, the prioritized actions component 326 groups the prioritized actions for the portfolio of assets based on relationships, features, and/or attributes between the aggregated data. In one or more embodiments, the prioritized actions component 326 determines the prioritized actions for the portfolio of assets based on a digital twin model associated with one or more assets from the portfolio of assets. Additionally or alternatively, in one or more embodiments, the prioritized actions component 326 determines the prioritized actions for the portfolio of assets based on a digital twin model associated with an operator identity associated with one or more assets from the portfolio of assets.

In one or more embodiments, the prioritized actions component 326 determines the list of the prioritized actions for the portfolio of assets based on metrics associated with the aggregated data. In certain embodiments, in response to the request 320, the prioritized actions component 326 determines one or more metrics for an asset hierarchy associated with the portfolio of assets. For instance, in one or more embodiments, the prioritized actions component 326 determines one or more metrics for an asset hierarchy associated with the edge devices 161a-161n in response to the request 320. In one or more embodiments, the prioritized actions component 326 converts a portion of the asset data 314 into a metric for the portion of the asset data 314 and stores the metric for the portion of the asset data 314 into the centralized control database 318. In one or more embodiments, the prioritized actions component 326 determines the one or more metrics for the asset hierarchy based on a model related to a time series mapping of attributes, features, and/or relationships for the asset data 314. For example, in one or more embodiments, the prioritized actions component 326 determines the one or more metrics for the asset hierarchy based on time series mapping of attributes, features, and/or relationships for the asset data 314 with respect to the centralized control database 318.

In one or more embodiments, in response to the request 320, the virtual assistant component 336 performs a natural language query with respect to the voice input data to obtain the one or more attributes associated with the one or more asset insight requests. For example, in one or more embodiments, the virtual assistant component 336 performs natural language processing with respect to the voice input data to obtain the one or more attributes associated with the one or more asset insight requests. In one or more embodiments, the virtual assistant component 336 converts the voice input data into a text string such that the text string associated with one or more textual elements. In one or more embodiments, the virtual assistant component 336 employs natural language processing (e.g., one or more natural language processing techniques) to determine textual data associated with the voice input data. In one or more embodiments, the virtual assistant component 336 queries a natural language database based on the voice input to determine the one or more attributes associated with the one or more asset insight requests. In one or more embodiments, the virtual assistant component 336 provides the one or more attributes, one or more tags, one or more labels, one or more classifications, and/or one or more other inferences with respect to the voice input data. For example, in one or more embodiments, the virtual assistant component 336 performs part-of-speech tagging with respect to the voice input data to obtain the one or more attributes, one or more tags, one or more labels, one or more classifications, and/or one or more other inferences with respect to the voice input data. In one or more embodiments, the virtual assistant component 336 performs one or more natural language processing queries with respect to the centralized control database 318 based on the one or more tags, the one or more labels, the one or more classifications, the one or more attributes, and/or the one or more other inferences with respect to the voice input data.

In one or more embodiments, the virtual assistant component 336 employs one or more machine learning techniques to facilitate determination of the one or more attributes, the one or more tags, the one or more labels, the one or more classifications, and/or the one or more other inferences with respect to the voice input data. For instance, in one or more embodiments, the virtual assistant component 336 performs a fuzzy matching technique with respect to the voice input data to determine the one or more attributes associated with the one or more asset insight requests. Additionally or alternatively, in one or more embodiments, the virtual assistant component 336 provides the voice input data to a neural network model configured for determining the one or more attributes associated with the one or more asset insight requests.

In one or more embodiments, the virtual assistant component 336 obtains aggregated data associated with the portfolio of assets based on the one or more attributes, the one or more labels, the one or more tags, the one or more classifications, /or the one or more other inferences with respect to the voice input data. Additionally, in one or more embodiments, the virtual assistant component 336 determines one or more asset insights for the portfolio of assets based on the aggregated data. In one or more embodiments, the virtual assistant component 336 groups, based on the one or more attributes, the aggregated data based on one or more relationships between assets from the portfolio of assets. In one or more embodiments, the virtual assistant component 336 applies the one or more attributes to at least a first model associated with a first type of asset insight and a second model associated with a second type of asset insight. In one or more embodiments, the virtual assistant component 336 aggregates first output data from the first model and second output data from the second model to determine at least a portion of the aggregated data. In one or more embodiments, in response to the voice input, the virtual assistant component 336 determines prioritized actions for the portfolio of assets based on the one or more attributes. In certain embodiments, in response to the voice input, the virtual assistant component 336 determines one or more metrics for an asset hierarchy associated with the portfolio of assets. For instance, in one or more embodiments, the virtual assistant component 336 determines one or more metrics for an asset hierarchy associated with the edge devices 161a-161n in response to the voice input.

In one or more embodiments, in response to the request 320, the dashboard visualization component 308 generates dashboard visualization data 322 associated with the one or more metrics for the asset hierarchy. For instance, in one or more embodiments, the dashboard visualization component 308 provides the dashboard visualization to an electronic interface of a computing device based on the dashboard visualization data 322. In one or more embodiments, the dashboard visualization data 322 and/or the dashboard visualization associated with the dashboard visualization data 322 includes the metrics for an asset hierarchy associated with the portfolio of assets. In one or more embodiments, in response to the request 320, the dashboard visualization component 308 associates aspects of the asset data 314 and/or metrics associated with the asset data 314 stored in the centralized control database 318 to provide the one or more metrics. For example, in one or more embodiment, in response to the voice input, the dashboard visualization component 308 associates aspects of the asset data 314 and/or metrics associated with the asset data 314 stored in the centralized control database 318 to provide the one or more metrics. In an aspect, the dashboard visualization component 308 determines the aspects of the asset data 314 and/or metrics associated with the asset data 314 stored in the centralized control database 318 based on the time series structure and/or the hierarchy structure of asset level of the centralized control database 318.

In one or more embodiments, the dashboard visualization data 322 and/or the dashboard visualization associated with the dashboard visualization data 322 includes the prioritized actions for the portfolio of assets. In one or more embodiments, the dashboard visualization data 322 and/or the dashboard visualization associated with the dashboard visualization data 322 includes the list of the prioritized actions. In one or more embodiments, the dashboard visualization data 322 and/or the dashboard visualization associated with the dashboard visualization data 322 includes the grouping of the prioritized actions for the portfolio of assets. In one or more embodiments, the dashboard visualization data 322 and/or the dashboard visualization associated with the dashboard visualization data 322 includes the metrics for an asset hierarchy associated with the portfolio of assets.

In one or more embodiments, in response to the voice input, the dashboard visualization component 308 generates the dashboard visualization data 322 associated with the one or more metrics for the asset hierarchy. In one or more embodiments, the dashboard visualization data 322 and/or the dashboard visualization associated with the dashboard visualization data 322 is configured based on the one or more attributes associated with the voice input. In one or more embodiments, the dashboard visualization data 322 and/or the dashboard visualization associated with the dashboard visualization data 322 includes a dashboard visualization element configured to present sensor data related to the portfolio of assets, a dashboard visualization element configured to present control data related to the portfolio of assets, a dashboard visualization element configured to present labor management data related to the portfolio of assets, a dashboard visualization element configured to present warehouse execution data related to the portfolio of assets, a dashboard visualization element configured to present inventory data related to the portfolio of assets, a dashboard visualization element configured to present warehouse management data related to the portfolio of assets, a dashboard visualization element configured to present machine control data related to the portfolio of assets, and/or one or more other dashboard visualization elements associated with the one or more asset insights.

Additionally, in one or more embodiments, the dashboard visualization component 308 performs one or more actions based on the metrics. For instance, in one or more embodiments, the dashboard visualization component 308 generates dashboard visualization data 322 associated with the one or more actions. In an embodiment, an action includes generating a user-interactive electronic interface that renders a visual representation of the one or more metrics. In another embodiment, an action from the one or more actions includes transmitting, to a computing device, one or more notifications associated with the one or more metrics. In another embodiment, an action from the one or more actions includes providing an optimal process condition for an asset associated with the asset data 314. For example, in another embodiment, an action from the one or more actions includes adjusting a set-point and/or a schedule for an asset associated with the asset data 314. In another embodiment, an action from the one or more actions includes one or more corrective action to take for an asset associated with the asset data 314. In another embodiment, an action from the one or more actions includes providing an optimal maintenance option for an asset associated with the asset data 314. In another embodiment, an action from the one or more actions includes an action associated with the application services layer 225, the applications layer 230, and/or the core services layer 235.

Additionally, in one or more embodiments, the dashboard visualization component 308 performs one or more actions based on the prioritized actions for the portfolio of assets. In an embodiment, an action includes generating a user-interactive electronic interface that renders a visual representation of the prioritized actions for the portfolio of assets and/or the one or more metrics. In another embodiment, an action from the one or more actions includes transmitting, to a computing device, one or more notifications associated with the prioritized actions for the portfolio of assets and/or the one or more metrics. In one or more embodiments, the dashboard visualization data 322 and/or the dashboard visualization associated with the dashboard visualization data 322 configures the dashboard visualization for remote control of one or more assets from the portfolio of assets based on the one or more attributes associated with the voice input. In one or more embodiments, the dashboard visualization data 322 and/or the dashboard visualization associated with the dashboard visualization data 322 configures a three-dimensional (3D) model of an asset from the portfolio of assets for the dashboard visualization based on the one or more attributes associated with the voice input (e.g., the voice input associated with the request 320). In one or more embodiments, the dashboard visualization data 322 and/or the dashboard visualization associated with the dashboard visualization data 322 filters one or more events associated with the asset related to the 3D model based on the one or more attributes associated with the voice input. In one or more embodiments, the dashboard visualization data 322 and/or the dashboard visualization associated with the dashboard visualization data 322 configures the dashboard visualization for real-time collaboration between two or more computing devices based on the one or more attributes associated with the voice input.

The system 300 may be configured to interact with or include a computing device 360. For example, the system 300 may communicatively couple with the computing device 360 via the network 110. The computing device 360 may be a mobile computing device, a smartphone, a tablet computer, a mobile computer, a desktop computer, a laptop computer, a workstation computer, a wearable device, a virtual reality device, an augmented reality device, or another type of computing device located remote from the asset performance management computer system 302. In one or more embodiments, the computing device 360 may generate the request 320. For example, in one or more embodiments, the request 320 may be generated via a visual display (e.g., a user interface) of the computing device 360. In one or more embodiments, the computing device 360 may generate a voice input. For example, in one or more embodiments, the voice input (e.g., the voice input associated with the request 320) is generated via one or more microphones of the computing device 360 and/or one or more microphones communicatively coupled to the computing device 360. In one or more embodiments, the computing device 360 may employ mobile computing, augmented reality, cloud-based computing, IoT technology and/or one or more other technologies to provide performance data, video, audio, text, graphs, charts, real-time data, graphical data, one or more communications, one or more messages, one or more notifications, and/or other media data associated with the one or more metrics. The computing device 360 includes mechanical components, electrical components, hardware components and/or software components to facilitate determining prioritized actions and/or one or more metrics associated with the asset data 314.

Figure 4:
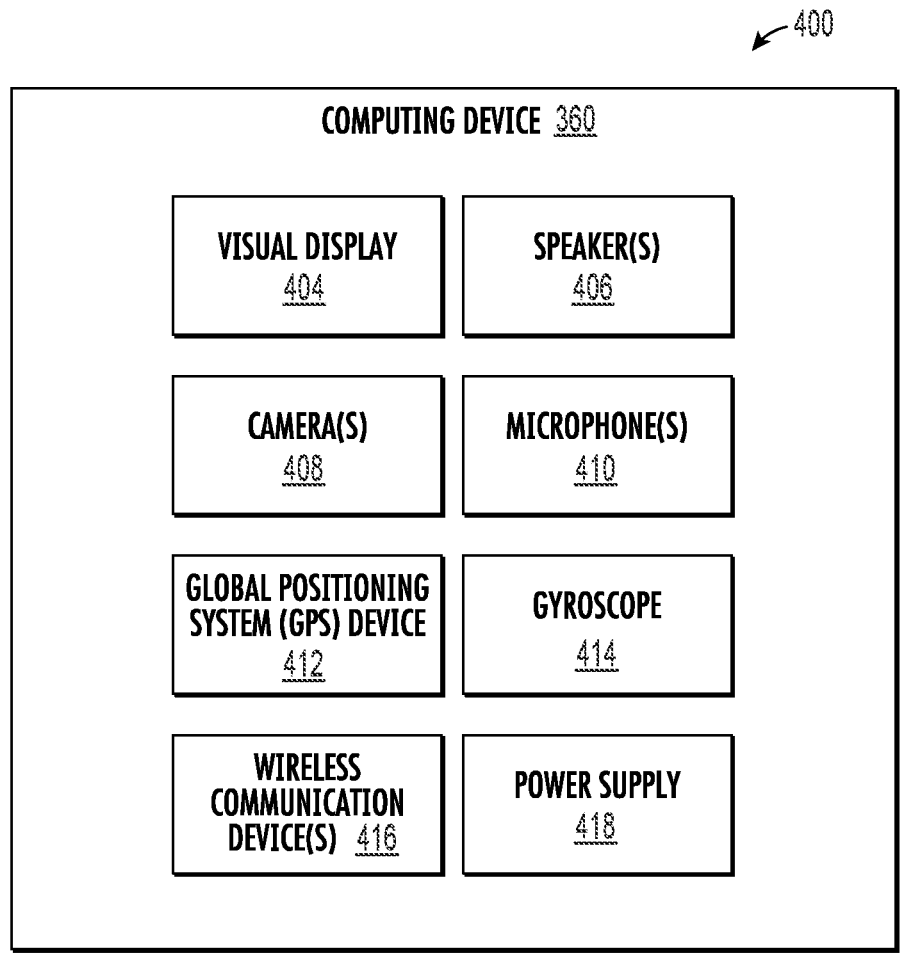
FIG. 4 illustrates an exemplary computing device, in accordance with one or more embodiments described herein.

Referring to FIG. 4, the computing device 360 is shown in greater detail. The computing device 360 may be a part of a system 400 that may include a visual display 404, one or more speakers 406, one or more cameras 408, one or more microphones 410, a global positioning system (GPS) device 412, a gyroscope 414, one or more wireless communication devices 416, and/or a power supply 418.

In an embodiment, the visual display 404 is a display that facilitates presentation and/or interaction with one or more portions of the dashboard visualization data 322. In one or more embodiments, the computing device 360 displays an electronic interface (e.g., a graphical user interface) associated with an asset performance management platform. In one or more embodiments, the visual display 404 is a visual display that renders one or more interactive media elements via a set of pixels. The one or more speakers 406 include one or more integrated speakers that project audio. The one or more cameras 408 include one or more cameras that employ autofocus and/or image stabilization for photo capture and/or real-time video. The one or more microphones 410 include one or more digital microphones that employ active noise cancellation to capture audio data. In one or more embodiments, at least a portion of the voice input is generated via the one or more microphones 410. The GPS device 412 provides a geographic location for the computing device 360. The gyroscope 414 provides an orientation for the computing device 360. The one or more wireless communication devices 416 includes one or more hardware components to provide wireless communication via one or more wireless networking technologies and/or one or more short-wavelength wireless technologies. The power supply 418 is, for example, a power supply and/or a rechargeable battery that provides power to the visual display 404, the one or more speakers 406, the one or more cameras 408, the one or more microphones 410, the GPS device 412, the gyroscope 414, and/or the one or more wireless communication devices 416. In certain embodiments, the dashboard visualization data 322 associated with the one or more metrics, the prioritized actions and/or the one or more asset insights related to the portfolio of assets is presented via the visual display 404 and/or the one or more speakers 406.

Figure 5:
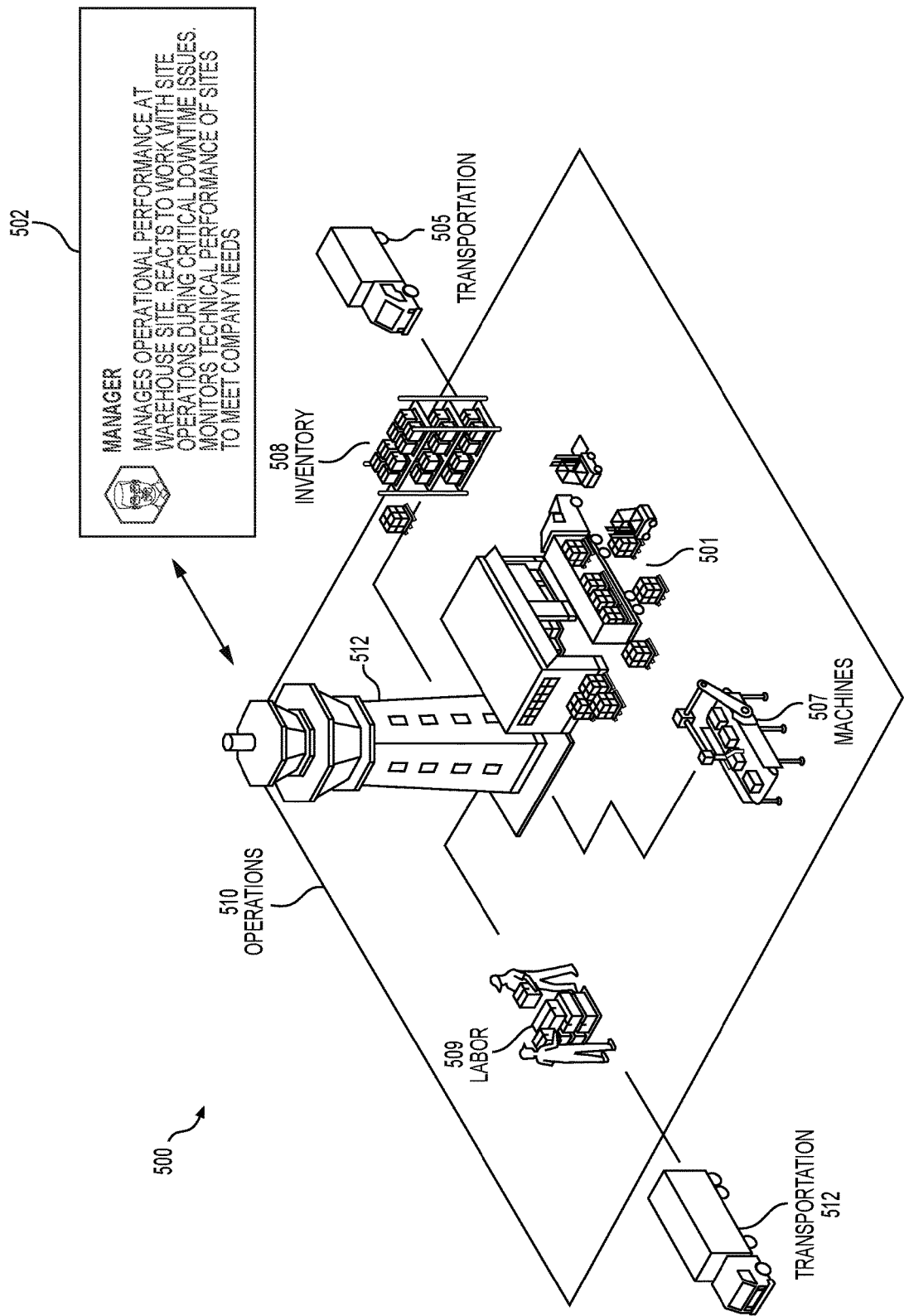
FIG. 5 illustrates an exemplary warehouse environment implementing methods and systems of this disclosure.

FIG. 5 illustrates a system 500 that includes an exemplary warehouse and distribution center environment 501. The system 500 may include components that are connected and monitored by a manager 502 using, for example, the computing device 360. The manager 502 may be, for example, a shift or area supervisor or a site operations manager and based on the role of the manager 502, the information displayed to the manager 502 using the systems and devices described herein may change. The manager 502 may be identified to the system 500 using, for example, a user identifier that may describe the mangers role associated with access to a dashboard visualization. In some embodiments, particular data may be obtained, aggregated, and displayed to the manager 502 based on the user identifier associated with the manager.

The system 500 may include various components including delivery transportation 505 (e.g., supply chain delivery truck) to load into inventory 508. An operational control tower 512 may monitor and/or otherwise control operations 510 within the environment 501. Operations 510 can be performed and/or managed by labor 509. Operations 510 can include assembly/sorting machines 507. Once assembled, packaged, and otherwise processed for distribution, delivery transportation 514 (e.g., a freight truck) can be loaded by labor 509 and/or sorting machines 507 and depart for its subsequent destination. Each of the warehouses may be configured such that worker performance is optimized by users and/or automated tools selectively scheduling and assigning tasks and worker equipment, as discussed more particularly below. The system 500 may be configured such that the warehouse environment 501 is capable of generating data regarding the optimized performance of tasks and data associated with key performance indicators (KPIs) such that the manager 502 and other users can measure the performance of each of the various warehouses as explained in greater detail below. The warehouse environment 501 may be communicatively coupled with one or more other warehouses or systems and the regional manager 502 via a network (e.g., a cloud network such as the network 110).

Figure 6:
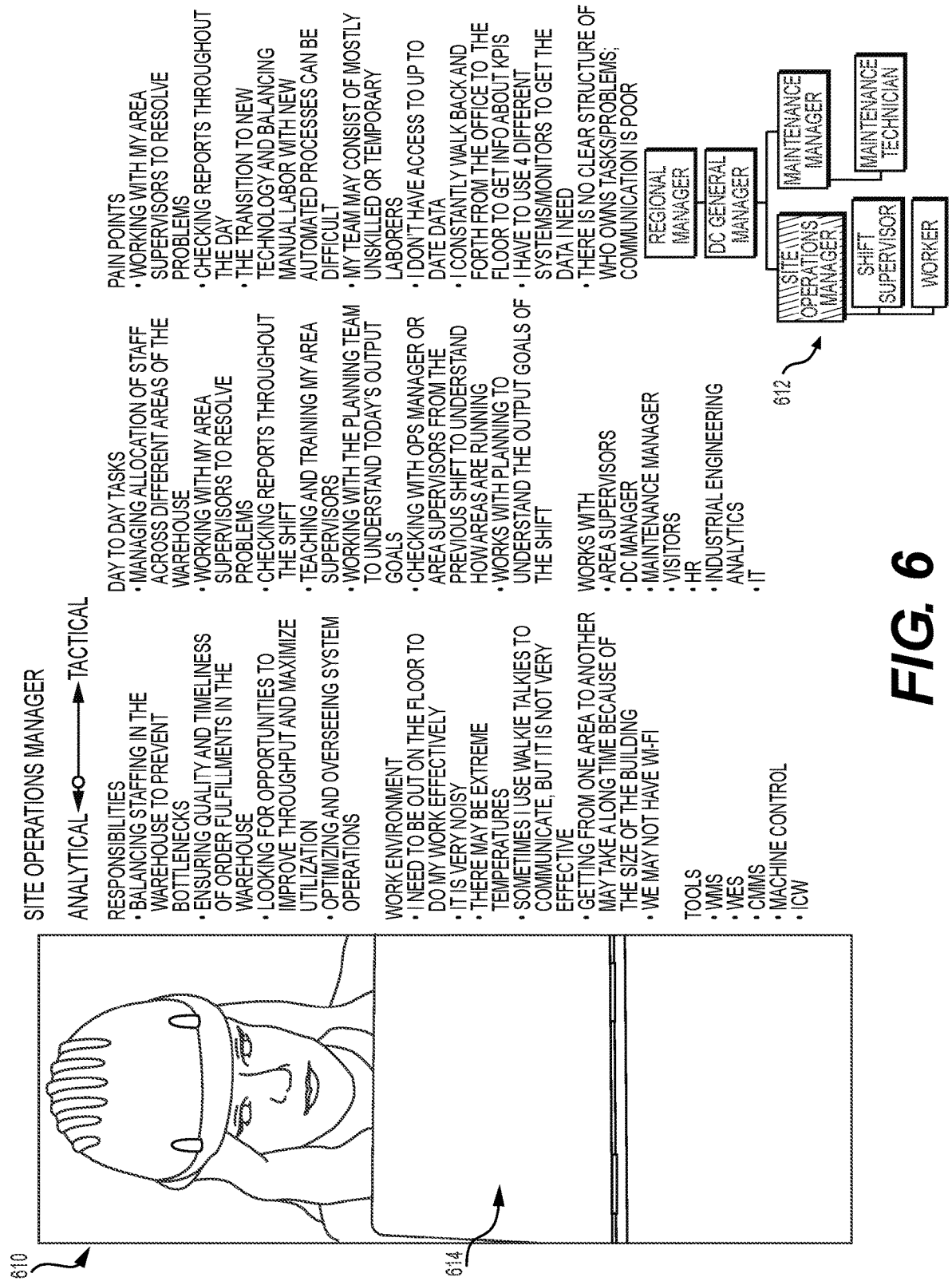
FIG. 6 illustrates an exemplary site operations manager who may implement methods and systems of this disclosure.

FIG. 6 shows a site operations manager 610 using a device 614. Within an enterprise, the site operations manager 610 may be responsible for analytic thinking that may optimize site performance. For example, the site operations manager may be responsible for analyzing input from a warehouse execution system (WES) and a labor management system (LMS) to maximize throughput and/or productivity of an environment such as the environment 501. The device 614 may be substantively similar to the computing device 360. On a hierarchy 612, a site operations manager may report directly to a DC general manager, who may in turn report to a regional manager. The site operations manager may have various tools at his or her disposal (e.g., the device 614) to monitor, analyze, and execute actions within the warehouse environment 501.

The LMS may be used to, for example, measure key worker performance metrics which metrics may be used to determine the effectiveness of individual or groups of workers in the warehouse environment. Worker performance metrics may include, but are not limited to, for example, worker productivity, overall performance against a predetermined plan (e.g., time worked versus number of units moved), "on standard", percent effectiveness, attendance, engagement (e.g., determined objectively from worker computing devices), clicks per hour by the individual worker, time spent with eyes on a display screen, etc. The LMS may measure work effectiveness in real time and may execute actions and/or make recommendations to a user to optimize labor effectiveness in the warehouse environment. For example, the LMS may execute or recommend where best to locate labor, when to move labor, when to reduce or increase the size of labor, and other factors relating to management of labor. The WES may be used to manage and control functions within the warehouse environment. The WES may control automated facilities, labor, and/or equipment to coordinate each aspect through dynamic optimization based on real-time inputs from the various sensors in the warehouse environment.

FIG. 7 shows a shift supervisor 710 (or "area supervisor") holding a device 714. Within an enterprise, the shift supervisor 710 may be responsible for tactical as well as analytical thinking. In a hierarchy 712, the area supervisor may report to the site operations manager 610. The shift supervisor 710 may have various tools at his or her disposal (e.g., the device 360 [change this in the Fig]) to monitor, analyze, and execute actions within the warehouse environment 501. The device 714 may be substantively similar to the computing device 360.

FIG. 8 depicts an example user interface 810 for of an example computing device 822. As seen, via user interface 810 one or more aspects of warehouse throughput or productivity can be viewed and one or more tasks can be executed and/or assigned to one or more users (e.g., crew member) or equipment. The example user interface 810 may display notifications related to throughput or performance or the one or more tasks, such as, for example, a newly assigned task or feedback related to an already-assigned task, which may include information controls for users to accept, snooze, and/or otherwise interact with information displayed (e.g., propose or execute modifications to a task, work plan, and/or the like).

FIG. 9 shows an exemplary dashboard 900 for monitoring, analyzing, and executing one or more warehouse actions. The dashboard 900 may be displayed for instance, on the display of the example computing device 822 or the computing device 360. The dashboard 900 may include information such as analytics related to various aspects of the warehouse environment 901 and may make one or more recommendations based on data generated by the one or more sensors in the warehouse environment 901. The dashboard can display, for example, information in a machine related to the machines 910, the labor 915, and the inventory 912 within the warehouse environment 501. The dashboard 900 may display, for example, one or more operational descriptors of the various aspects of the warehouse. For example, the dashboard may display asset health, performance, quality, a functional status (e.g., running, not running, degraded _%, etc.), a capacity, a maintenance status (e.g., maintenance requested, last maintenance completion, lists of maintenance, etc.), a list of users and authorized users, and other information related to the particular aspect chosen to be displayed (e.g., the machines 910).

In some embodiments, the dashboard 900 may be configured to provide access to the WES. For example, a user may be able to see order backlog at different functional areas (e.g., order picking, shipping, routing, etc.) The dashboard 900 may provide real-time access to order receipt, processing, and throughput to properly track order waves.

In some embodiments, the dashboard 900 may be configured to display information generated in the LMS such that the user of the dashboard is integrated into the LMS through the dashboard 900. The LMS may display information such as, for example, a current allocation of labor throughout the warehouse, or the particular skills and qualifications of individual warehouse associates. The dashboard 900 may be configured to display recommendations regarding where the best location is to place workforce in order to maximize operations. The system may develop and track benchmarks (e.g., maximum work productivity) in order that worker productivity on any given day can be measured against maximum work productivity. In some embodiments, the dashboard 900 may be configured such that recommendations regarding capacity smoothing are provided to a user. The capacity smoothing recommendations may be based on, for example, a comparison work capacity on any particular day at a given work location versus the maximum capacity for work at that location.

In some embodiments, the dashboard 900 may display one or more insights or recommendations with respect to the integration of worker tasks, which may be integrated using, for example, one or more audio devices 914 (which may be configured to play and sense audible data (e.g., using speakers and/or a microphone)) and one or more computing devices 916 (which may include a display and an input/output device (e.g., a touchscreen)).

In some embodiments, the visualization may be configured based on a user identifier associated with a user of the computing device used to display the dashboard 900 (e.g., the manager 502). For example, the manager 502 may receive different information based on his or her user profile as compared with a regional manager or other level of user of the system (as shown in the hierarchies herein). The user profile may be determined based on one or more hierarchical structures such as the hierarchies shown in FIGS. 6 and 7. The user identifier may be used to configure a display (e.g., present different information) to a user based on the identity of the user.

Figure 10:
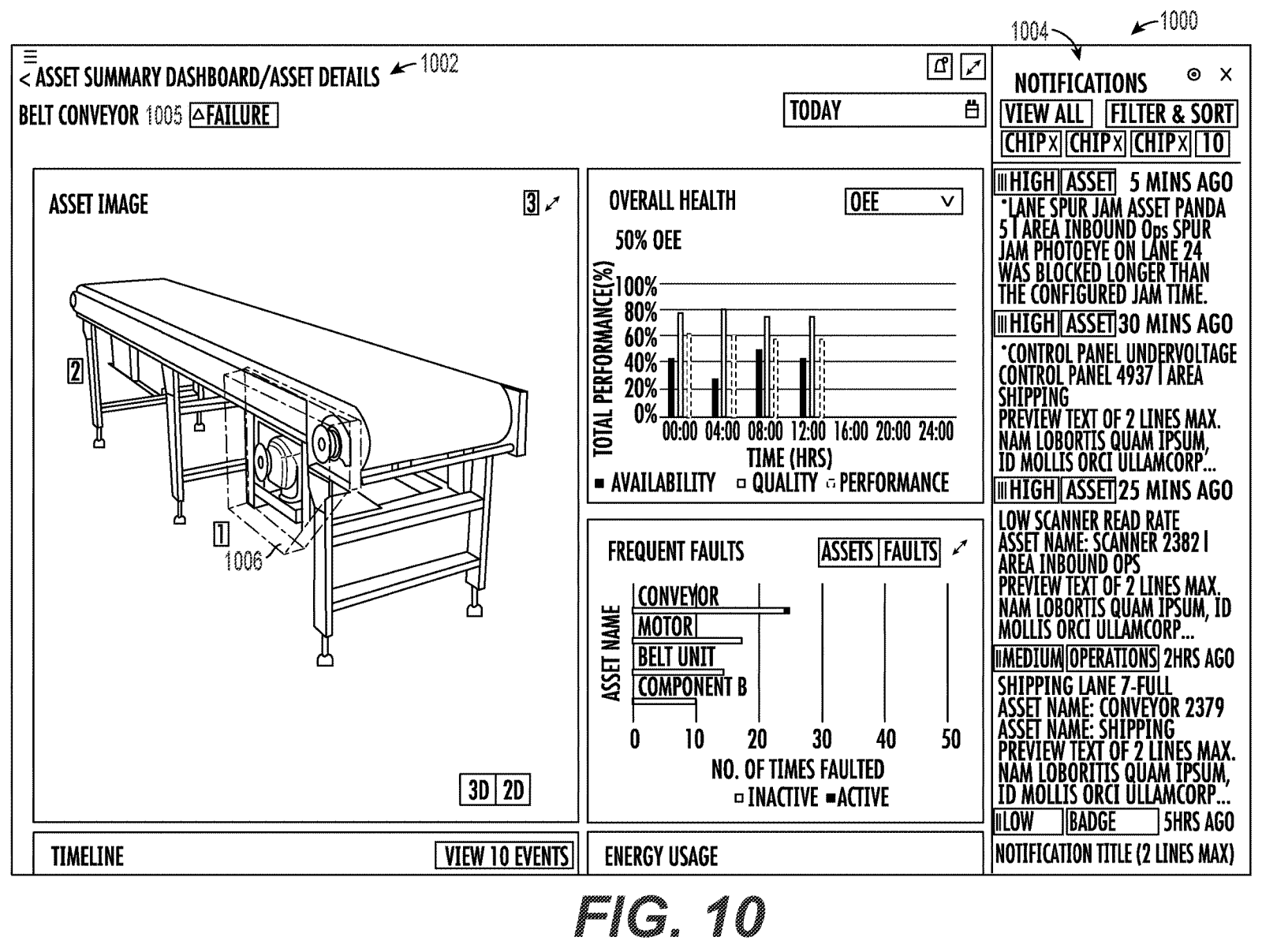

FIG. 10 illustrates an exemplary electronic interface 1000 according to one or more embodiments of the disclosure. In an embodiment, the electronic interface 1000 is an electronic interface of the computing device 360 that is presented via the visual display 404. In one or more embodiments, a dashboard visualization is presented via the electronic interface 1000. In certain embodiments, the data visualization presented via the electronic interface 1000 presents one or more asset insights 1002 and/or one or more notifications 1004 via the dashboard visualization associated with the electronic interface 1000. The asset insights 1002 and/or notifications 1004 may be related to one or more features of the warehouse system 500 of FIG. 5 (e.g., the machines 522, the labor 518, etc.) In one or more embodiments, the data visualization presented via the electronic interface 1000 includes a 3D model 1006 associated with an asset from a portfolio of assets. In one or more embodiments, one or more events associated with the 3D model 1006 can be filtered and/or information associated with the one or more events can be displayed in response to selection of one or more interactive buttons associated with the 3D model 1006.

Figure 11:
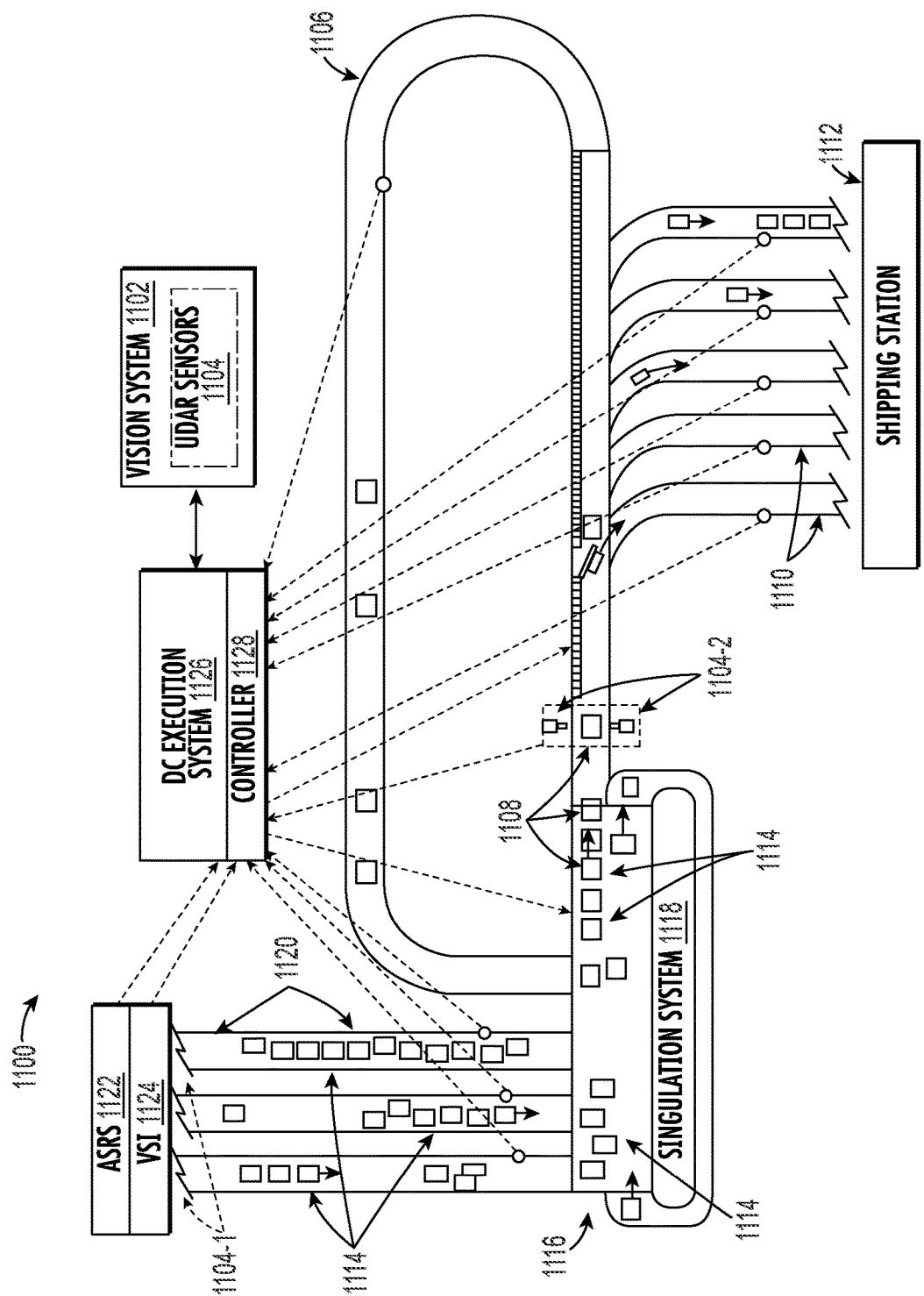
FIG. 11 illustrates a schematic view of a material handling system including LiDAR based vision system, in accordance with one or more embodiments described herein.

FIG. 11 illustrates a schematic view of a material handling system 1100, in accordance with one or more embodiments described herein. In one or more embodiments, the material handling system 1100 corresponds to an enterprise from the enterprises 160*a-n*. In one or more embodiments, the material handling system 1100 includes one or more assets from a portfolio of assets. The material handling system 1100 includes at least one vision system 1102 with one or more LiDAR based sensors 1104, according to an example embodiment. The material handling system 1100 may correspond to a material handling environment for example, but not limited to, a distribution center, a shipping station, a warehouse, an inventory, etc. According to some example embodiments, the material handling system 1100 includes one or more conveyors for handling various items such as, cartons, totes, shipping packages, boxes etc. As illustrated, the material handling system 1100 includes a sorter portion 1106 for selectively identifying, sorting and/or diverting one or more articles 1108 to one of the destinations 1110, such as, but not limited to, takeaway conveyors, chutes, and the like. In some examples, the diverted articles may be sent to shipping 1112 for shipping to a destination, for example, a store. While the example as shown in FIG. 11 may illustrate a paddle sorter, it is noted that the scope of the present disclosure is not limited to a paddle sorter. In some examples, the material handling system 1100 may include other types of sorter(s) may be implemented, including, but not limited to, pusher/puller sorters, pop-up transfer sorters, and/or cross-belt sorters.

Although the LiDAR sensors 1104 are illustrated to be located within the vision system 1102, however, according to various example embodiments described herein, multiple LiDAR based sensors are installed at various sections of the material handling system 1100. In other words, the LiDAR sensors 1104 may be positioned at various different sections (e.g. workstations) within the material handling system 1100. Further, in one or more embodiments, these LiDAR based sensors are communicatively coupled (e.g. remotely connected) to the vision system 1102, via a communication network (e.g. wireless or wired network).

Referring to FIG. 11, illustratively, a first LiDAR sensor unit 1104-1 is installed near an area corresponding to an automated storage and retrieval system (ASRS) 1122. Similarly, a second LiDAR sensor unit 1104-2 may be installed near another area corresponding to a singulation system along the sorter 1106. In another example, similar LiDAR based sensor units may be located at the shipping station 1112 or at various other positions (not shown) along the sorter 1106. Accordingly, the material handling system 1100 may include many more such LiDAR sensor units that are installed or mounted at various sections (e.g. dedicated zones) of a material handling environment. As stated before, in one or more embodiments, these sensor units are communicatively coupled to the vision system 1102, via the communication network. These LiDAR based sensor units may be capable of capturing a data stream (e.g. 3D data stream) representative of a 3D scan of that area where the respective LiDAR sensor unit is located. In one or more embodiments, the data stream is used by the vision system 1102 to monitor, one or more articles 1114, machines, and/or workers present in various sections of the material handling system 1100.

As illustrated, in one or more embodiments, the material handling system 1100 includes a sorter portion (e.g. the sorter 1106) that receives the one or more articles 1114 from an induction portion 1116. In some examples, the induction portion 1116 is associated with a singulation system 1118 that is configured to generate spacing between the one or more articles 1114. For example, the induction portion 1116 may comprise various mechanical components e.g. configurations of belt units and/or mechanical actuators with end effectors, which may create the required spacing between the one or more articles 1114. In accordance with some example embodiments, LiDAR based sensors of the LiDAR sensor unit 1104-2 may capture a 3D scan of various operations and/or activities that may be performed on the singulation system 1118.

In some examples, the induction portion 1116 receives articles 1114 from a merge portion 1120, as shown in FIG. 11. The merge portion 1120 may have multiple accumulation lanes and/or conveyors for releasing articles in a slug and/or zipper fashion onto the induction portion 1116. In some examples, the merge portion 1120 may receive the one or more articles 1114 from a receiving system and/or an automated storage and retrieval system (ASRS) 1122. Additionally, or alternatively, the merge portion 1120 may receive the one or more articles from other sources. In some example embodiments, the ASRS 1122 may also include a separate vision system (VS1) 1124 with one or more LiDAR based sensor units (similar to 1104-1, 1104-2) that may be installed at various locations within the ASRS 1122.

According to some example embodiments, the LiDAR sensors 1104 of the vision system 1102 are configured for scanning a target area of the material handling environment and generate one or more data streams. In some example embodiments, a processor of the vision system 1102 may utilize a data stream to construct 3D point cloud that may represent a 3D-scan of the target area. As an example, a data stream recorded by these LiDAR sensors may capture various operations of a material handling site e.g. movement of the one or more articles 1114, e.g. from the induction portion 1116 towards the sorter portion 1106 or from the ASRS 1122 to the merge portion 1120, and so on. Further, data streams from various LiDAR sensors 1104 may also capture operations and/or actions performed by various machines of the material handling site. For instance, in an example, the data stream may capture movement of various mechanical components e.g. conveyor belts etc. of the singulation system. Furthermore, the data streams may also capture operations performed by one or more workers in that target area.

According to some example embodiments, one or more components of the example material handling system 1100, such as, but not limited to, the sorter portion 1106, the induction portion 1116, the merge portion 1120, the vision system 1102, and/or the like, may be communicably coupled to at least one of a central system e.g., a distribution center (DC) execution system 1126 (or a warehouse execution system, a warehouse management system, a labor management system, a machine control system, and/or another system) and/or a controller 1128. In one or more embodiments, the controller 1128 is configured for machine control. The term "communicably coupled" refers to two or more components (for example, but not limited to, the sorter portion 1106, the induction portion 1116, the merge portion 1120, the vision system 1102, the DC execution system 1126 and the controller 1128 as shown in FIG. 11) being connected through wired means (for example but not limited to, wired Ethernet) and/or wireless means (for example but not limited to, Wi-Fi, Bluetooth, ZigBee), such that data and/or information may be transmitted to and/or received from these components.

Figure 12:
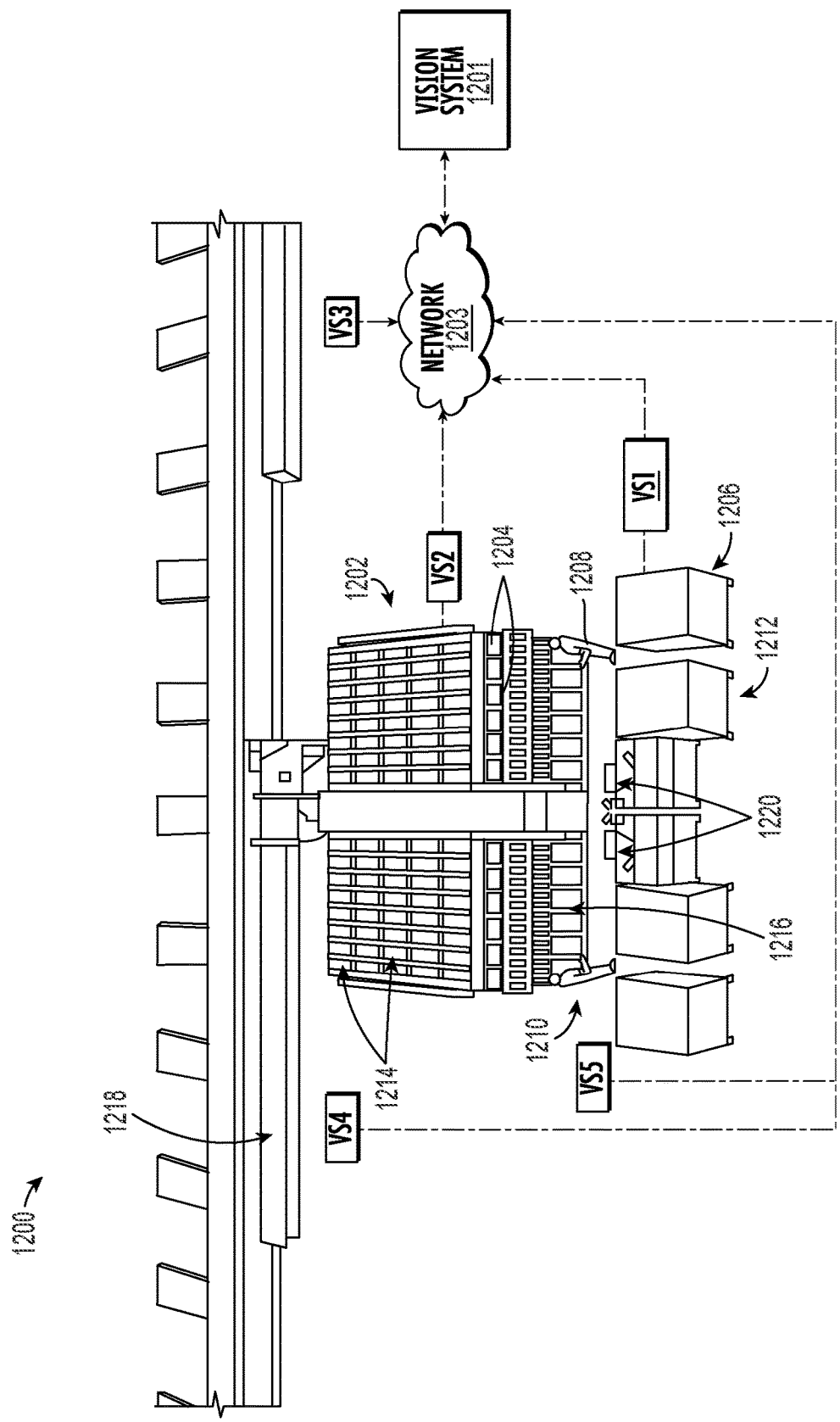
FIG. 12 illustrates a schematic view of a target area of the material handling system including the LiDAR based vision system, in accordance with one or more embodiments described herein.

FIG. 12 illustrates a schematic view 1200 of a target area of the material handling system 1100 including the LiDAR based vision system, according to an example embodiment. The target area may correspond to an area of a distribution center (DC). In one or more embodiments, the DC may receive goods in bulk from various manufacturers, suppliers, stores, shipping stations, and the like, and may store and/or handle received goods until the goods are further picked and/or shipped. Further, the received goods may be transferred into totes and/or containers of appropriate size, shape, material, etc. for storage and/or further processing. In accordance with some example embodiments described herein, the DC may include a vision system 1201 that may be communicatively coupled, via a network 1203, to multiple LiDAR based sensor units VS1, VS2, VS3, VS4, etc., as illustrated in FIG. 12. Similar to as described earlier in reference to FIG. 11, these LiDAR based sensor units (VS1-VSn) may be capable of recording data streams including 3D scan of a target area. The network 1203 may correspond to a wired or wireless communication network. In one or more embodiments, the vision system 101 corresponds to an asset from a portfolio of assets.

Illustratively, in some example embodiments, the DC may have a replenishment area 1202 for replenishing one or more containers 1204 with goods arriving at the replenishment area 1202 in multiple stock keeping units (SKUs) 1206. The term 'replenishment area' as used herein may refer to an area, system, workstation, and the like in the DC for transferring goods from the multiple SKUs 1206 into one or more containers 1204. The replenishment area 1202 may have a collaborative system of multiple material handling devices and systems, such as, but not limited to, infeed conveyors, outfeed conveyors, goods to operator workstations, devices, staging units, and the like. Transferring goods from an SKU into the containers 1204 may be automated, for example, may be done by a robotic tool, and/or may be a manual process carried out by an operator, such as operators 1208 and 1210, as shown in FIG. 12. In accordance with some example embodiments described herein, one or more LiDAR based sensors are associated with the replenishment area 1202 to perform a 3D scan that captures activities, operations, devices, and/or workers in the replenishment area 1202. Accordingly, in one or more embodiments, there are multiple vision systems that may be associated with different sections of the DC. In one or more embodiments, these vision systems employ LiDAR based sensors to record the activities related to operators, items, and/or machines within the respective section. As an example, as illustrated in FIG. 12, a vision system unit VS2 with one or more LiDAR sensors 204 is associated with the replenishment area 1202.

According to said example embodiments, an SKU 1206 may include goods of a similar type, size, shape, and/or any other common characteristic. In an embodiment, one or more SKUs 1206 may be grouped together and stacked on a pallet 1212, as shown in FIG. 12. The SKUs 1206 may be grouped based on a common characteristic, such as type of goods. Additionally, or alternatively, mixed SKUs 1206 may be grouped randomly and placed on the pallet 1212. The SKUs 1206 may be grouped and stacked on the pallet 1212 at the DC for ease of handling. In some embodiments, each SKU 1206 and each pallet 1212 may include a respective identifier (e.g. a barcode label, RFID tag) that is scanned at the replenishment area 1202. The scanned information indicates, in one or more embodiments, a location of the pallet 1212 at the replenishment area 1202. In some example embodiments, one or more LiDAR based sensor units may also be located in the DC to perform 3D scan of an area including the SKUs 1206 and/or pallets 1212. Illustratively, in an example, two vision system units VS1 and VS4 with LiDAR sensors may be located to track activities, operations, and/or characteristics associated with the SKUs 1206 and/or the pallets 1212.

In accordance with one or more embodiments, the replenishment area 1202 includes a gravity flow rack 1214 for staging and/or conveying one or more containers 1204. Further, the replenishment area 1202 may include multiple replenishment zones. The gravity flow rack 1214 may be placed between different replenishment zones, such that the gravity flow rack 1214 may convey replenished containers from a first replenishment zone 1216 to a second replenishment zone 1218 and convey empty containers back from the second replenishment zone 1218 to the first replenishment zone 1216. The gravity flow rack 1214 may also function as a staging area for the empty and/or filled containers 1204 until the containers 1204 are handled by the operator 1208 and/or a robotic tool. In accordance with some example embodiments, the vision system unit VS2 may scan the area including the gravity flow rack 1214.

The replenishment area 1202 may further include one or more devices 1220. The devices 1220 may refer to any portable and/or fixed device (e.g. a human machine interface HMI) that may be communicably coupled to a central controller (e.g. the controller 1128). In some examples, the devices 1220 may include an input/output interface which may be used for assisting the operator 1208 in the replenishment process. According one or more embodiments, the devices 1220 correspond to or include for example, but not limited to, scanners, imagers, displays, computers, communication devices, headsets, and the like. According to some example embodiments, the devices 1220 may further receive data, commands, workflows, etc. from the central controller and/or any other device that may be communicably coupled to the devices 1220. According to some example embodiments, the vision system units VS1 and VS5 using the LiDAR based sensors may perform a 3D scan of area including the one or more devices 1220.

According to some example embodiments, the data stream captured by the vision system 1201 may monitor various activities, operations, individuals, and/or equipment in the DC. For instance, the data stream may be used to monitor arrival of the pallets 1212 having one or more SKUs 1206 at the replenishment area 1202 of the DC. Further, the data stream may monitor scanning of a pallet identifier and/or an SKU identifier using the devices 1220 by any of the operators 1208 and/or 1210. In some example embodiments, the data stream captured by the LiDAR sensors 204 of the vision system 1201 may also include an operation by a robotic tool (not shown) and/or the operators (1208, 1210) to pick one or more of the containers 1204 on the gravity flow rack 1214 for replenishing the one or more containers 1204 with the goods that may be in the SKU 1206 and/or the pallet 1212. Further, in some example embodiments, the data stream captured by the LiDAR sensors 204 of the vision system units VS2, VS3, and/or VS4 may include conveyance or movement of the one or more containers 1204 that may be on the gravity flow rack 1214. In this aspect, the containers 1204 may be conveyed from the first replenishment zone 1216 to the second replenishment zone 1218 through the gravity flow rack 1214. In some example embodiments, the data stream may also include monitoring of empty container(s) that may be placed on the gravity flow rack 1214 for transferring back to the first replenishment zone 1216 for receiving goods from a next SKU and/or pallet. In an example embodiment, the data stream also includes movement of some containers to one or more shuttle totes that can be moved for storing goods in an Automated Storage and Retrieval System (ASRS) in the DC.

Figure 13:
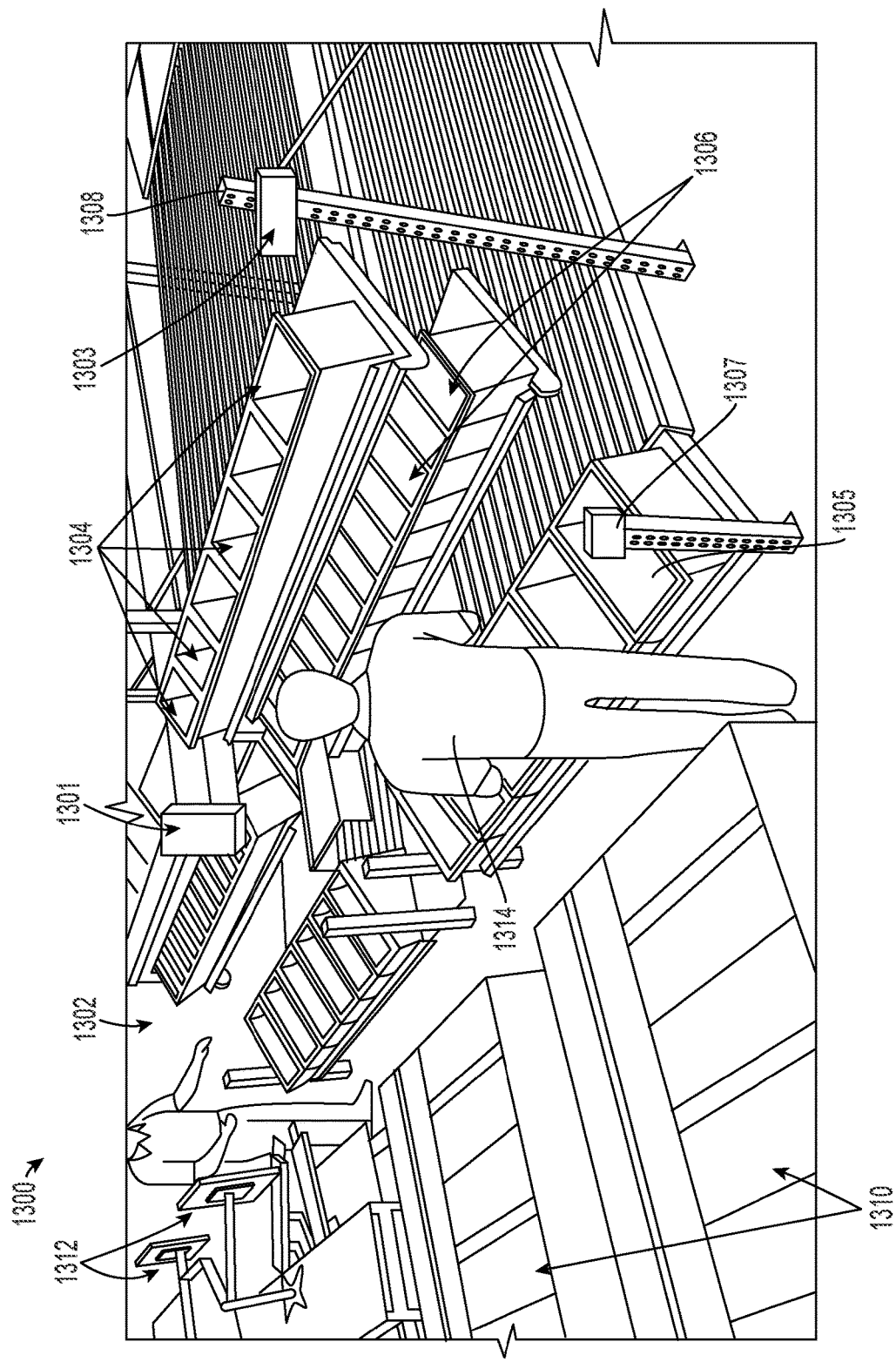
FIG. 13 illustrates an example scenario depicting monitoring of an operation performed by a worker in a material handling environment by using LiDAR based vision system, in accordance with one or more embodiments described herein.

FIG. 13 illustrates an example scenario 1300 depicting monitoring of an operation performed by a worker in a material handling environment by using LiDAR based vision system (e.g. the vision system 1102), according to an example embodiment. In some example embodiments, the operation may be performed in a replenishment zone of a distribution center. FIG. 13 illustrates an example of a replenishment zone 1302 of a distribution center. As described earlier, in one or more embodiments, a material handling environment includes a plurality of vision systems. Illustratively, in some example embodiments, a distribution center DC includes a plurality of vision systems (1301, 1303, 1307 etc.). Each of these vision systems (1301-1307) include one or more LiDAR based sensors that may be installed and/or mounted at various sections of the material handling environment. In this aspect, each of these vision systems 1301-1307 are capable of capturing a data stream (i.e. a 3D scan) of a target area. In one or more embodiments, the vision systems 1301-1307 correspond to respective assets from a portfolio of assets.

According to some example embodiments, the operation monitored by using LiDAR based vision systems corresponds to replenishing of one or more containers. The containers may be placed on a gravity flow rack 1308 and, in one or more embodiments, is replenished with goods from the one or more SKUs 1310 that may be arriving at a replenishment area of the replenishment zone 1302. According to some example embodiments, there may be different sizes of containers for replenishment in the DC. For instance, a first set of containers 1304 may be of moderate size, whereas a second set of containers 1306 may be smaller than the first set of containers 1304, and a third set of containers 1305 may be larger than containers of the first set of containers 1304. In one or more embodiments, the replenishment of containers is based on a size of the containers. According to one or more embodiments, each of the containers 1304, 1306, 1305 have an associated container identifier (not shown). The container identifier may refer to a unique identifier that may be used to identify a particular container, such as, but not limited to, a serial number, a barcode label, RFID tag, etc. The container identifier may include information regarding the container, such as, but not limited to, type, size, capacity, weight, shape, and the like.

In accordance with said example embodiments, a container identifier for a container may be scanned before performing each replenishment operation for that container. By scanning the container identifier, a central controller (e.g. the controller 1128) and/or any other computing device in the DC, may track an occupied volume of the container. Further, based on this information, the central controller may calculate a current capacity i.e. based on a maximum capacity of the container and the occupied volume. Said that, in accordance with said example embodiments, to maximize storage capacity and overall efficiency, it may be desired to pick appropriately sized container(s) from various sized containers for storing goods from the SKUs 1310.

Figure 14:
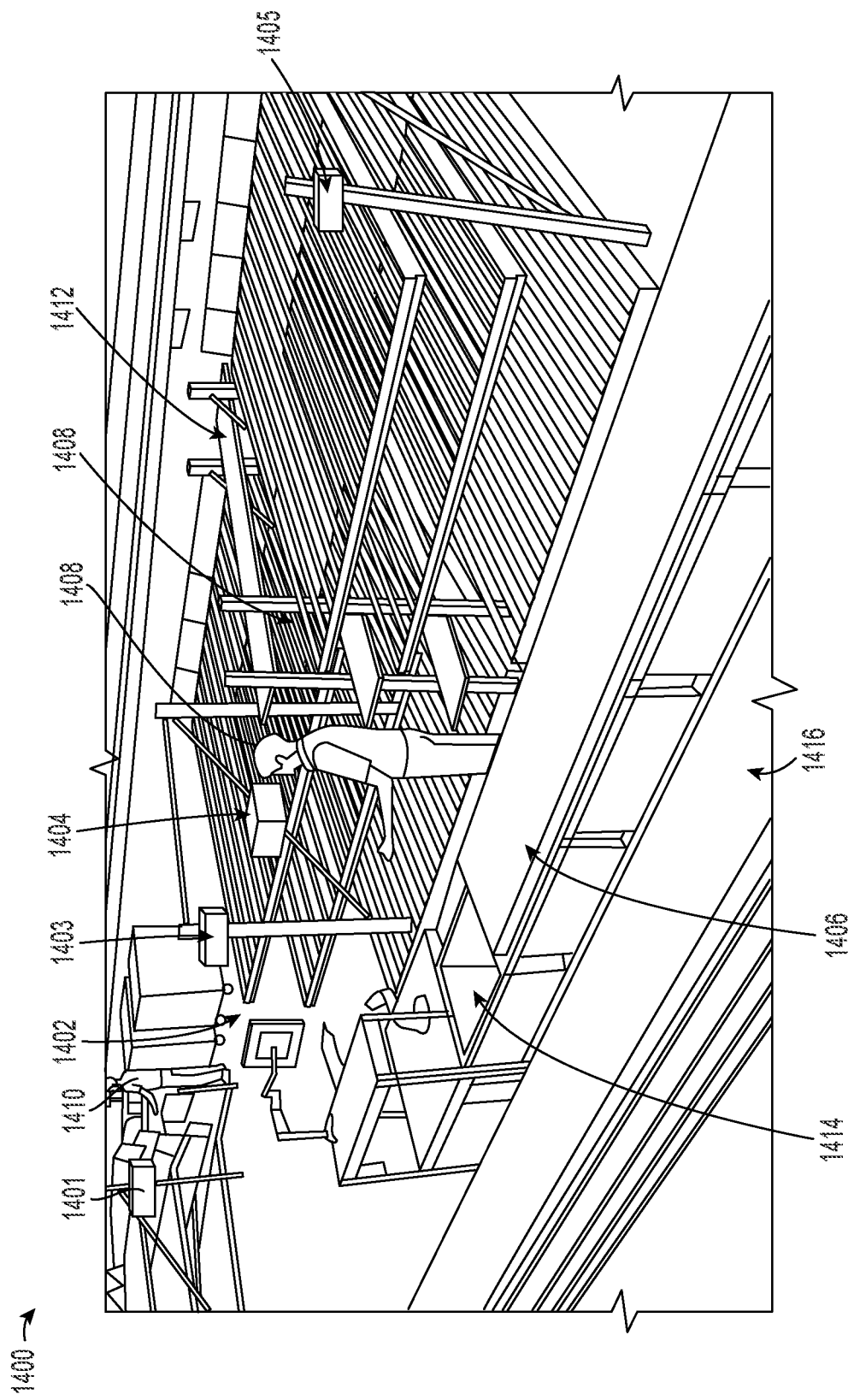
FIG. 14 illustrates another example scenario depicting another operation performed in a material handling environment that can be monitored by using LiDAR based vision system, in accordance with one or more embodiments described herein.

FIG. 14 illustrates another example scenario 1400 depicting another operation performed in a material handling environment that is monitored by using LiDAR based vision system (e.g. the vision system 1102), according to an example embodiment. FIG. 14 illustrates a perspective view of a second replenishment zone 1402 of the distribution center (DC), in accordance with one or more embodiments of the present disclosure. Illustratively, in some example embodiments, a distribution center DC includes a plurality of vision systems (1401, 1403, 1405 etc.). Each of these vision systems (1401-1405) includes one or more LiDAR based sensors that may be installed and/or mounted at various sections of the material handling environment. In this aspect, each of these vision systems 1401-1405 is configured to capture a data stream (i.e. a 3D scan) of a target area. In one or more embodiments, the plurality of vision systems (1401-1405) correspond to respective assets from a portfolio of assets. In accordance with some example embodiments, the data stream from the LiDAR sensor-based vision system captures an operation related to a replenishment process in the second replenishment zone 1402.

According to some example embodiments, a replenishment process illustrated in FIG. 14 includes replenishing of one or more containers from a second set of containers 1404 with goods from the replenished first set of containers 1406 that may be arriving at the second replenishment zone 1402 (e.g. through the gravity flow rack 1408). In some example embodiments, the second set of containers 1404 may correspond to shuttle totes used in an ASRS (e.g., the ASRS 1122) that may be having multiple compartments of different size. The shuttle totes may be partially filled or empty and may be used to store goods in a storage facility, such as the ASRS 1122 as illustrated in FIG. 11.

Figure 15:
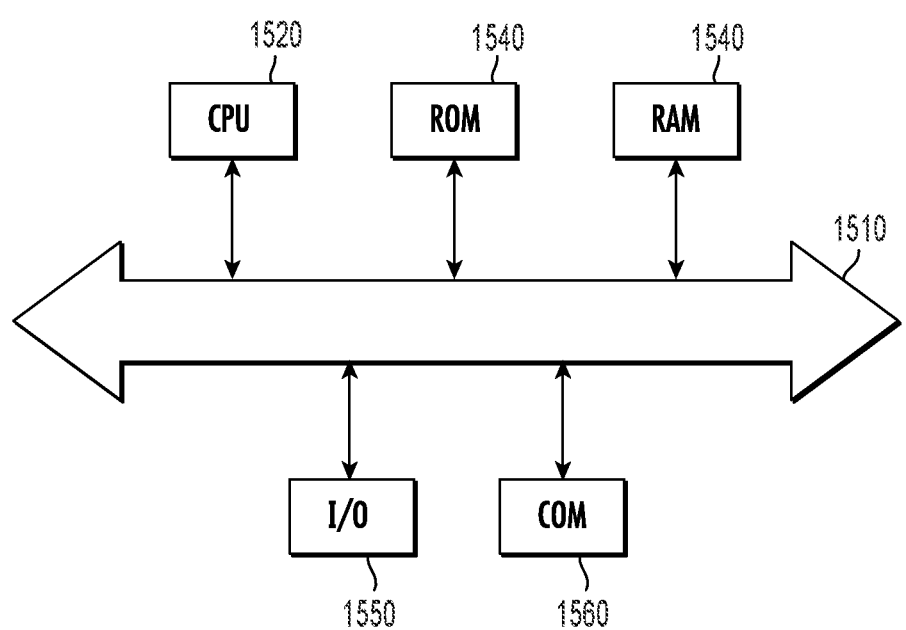
FIG. 15 illustrates a functional block diagram of a computer that may be configured to execute techniques described in accordance with one or more embodiments described herein.

FIG. 15 depicts an example system 1500 that may execute techniques presented herein. FIG. 15 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1560 for packet data communication. The platform also may include a central processing unit ("CPU") 1520, in the form of one or more processors, for executing program instructions. The platform may include an internal communication bus 1510, and the platform also may include a program storage and/or a data storage for various data files to be processed and/or communicated by the platform such as ROM 1530 and RAM 1540, although the system 1500 may receive programming and data via network communications. The system 1500 also may include input and output ports 1550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The systems and methods of this disclosure can be cloud-based, multi-tenant solutions configured to deliver optimized work instructions tailored for specific vertical workflows utilizing an easy to deploy, scalable, and configurable data model and software suite to deliver performance insights and improve worker productivity.

It should now be understood that current tools for monitoring warehouse operations may require users to extract data and generate insights from separate systems with disconnected interfaces and non-communicating components but that disaggregated, stovepiped systems may be overcome using systems and methods of receiving one or more edge devices to generate a dashboard visualization including one or more actions or recommendations, which dashboard visualization can simultaneously be used to execute one or more actions or follow the generated recommendation, thus overcoming the disaggregated and stovepiped nature of the various systems generating and sending data.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for monitoring performance of a warehouse, comprising:
   one or more processors;
   a memory, comprising one or more programs stored in the memory, the one or more programs comprising instructions configured to:
   receive a voice input, wherein the voice input comprises a request to generate a dashboard visualization associated with one or more edge devices, the request comprising:
   a categorization of one or more of the one or more edge devices; and
   at least one operational descriptor;
   and in response to the request:
   process the voice input, wherein processing the voice input comprises:
   converting the categorization of the voice input into a first text string and the at least one operational descriptor of the voice input into a second text string;
   determining one or more attribute tags associated with the voice input by querying a natural language database using at least one of the first text string or the second text string; and
   performing, using at least one of the one or more attribute tags, a natural language query to obtain aggregated data from a centralized control database;
   determine a status associated with the one or more edge devices for the aggregated data;
   configure the dashboard visualization to a remote-control format such that the dashboard visualization is configured to remotely control a first edge device of the one or more edge devices and enable real-time collaboration with a remote computing device;
   provide the dashboard visualization to an electronic interface of a computing device, the dashboard visualization comprising the status associated with the one or more edge devices;
   determine a list of prioritized actions for the one or more edge devices based on the status; and
   optimize a status of the one or more edge devices based on the determined list of prioritized actions.

2. The system of claim 1, the request further comprising a user identifier, the user identifier describing a user role for a user associated with access of the dashboard visualization via the electronic interface, and, in response to the request, the aggregated data is obtained based on the user identifier.

3. The system of claim 2, the one or more programs further comprising instructions configured to:
configure the dashboard visualization based on the user identifier.

4. The system of claim 1, the one or more programs further comprising instructions configured to:
provide the list of prioritized actions to a user via the dashboard visualization.

5. The system of claim 4, the one or more programs further comprising instructions configured to:
group the prioritized actions for the one or more edge devices based on relationships between the aggregated data; and
configure the dashboard visualization based on the grouping of the prioritized actions for the one or more edge devices.

6. The system of claim 4, the one or more programs further comprising instructions configured to:
rank, based on impact of respective prioritized actions with respect to the one or more edge devices, the prioritized actions to generate the list of the prioritized actions; and
provide the ranked list of the prioritized actions to the user via the dashboard visualization.

7. The system of claim 1, the one or more programs further comprising instructions configured to:
determine one or more recommendations for the one or more edge devices based on the status; and
provide the one or more recommendations to a user via the dashboard visualization.

8. The system of claim 1, the one or more programs further comprising instructions configured to:
configure the dashboard visualization to provide a visualization of operational capacity of the one or more edge devices.

9. The system of claim 1, the one or more programs further comprising instructions configured to:
receive an input from a labor management system;
receive an input from a warehouse execution system, wherein
the dashboard visualization is based on a status associated with one or more of the labor management system and the warehouse execution system.

10. The system of claim 9, the one or more programs further comprising instructions configured to:
receive, from the labor management system, a plurality of worker performance metrics based on data from the labor management system, wherein
the dashboard visualization is based on the plurality of worker performance metrics.

11. The system of claim 1, wherein to optimize the status of the one or more edge devices based on the determined list of prioritized actions the one or more programs further comprise instructions configured to perform a first action, wherein the first action comprises adjusting a set-point associated with at least one edge device of the one or more edge devices.

12. The system of claim 1, wherein processing the voice input is performed using a virtual assistant and providing the dashboard visualization is performed using a dashboard visualization component.

13. A method of monitoring performance of one or more a warehouses comprising:
receiving a voice input, wherein the voice input comprises a request to generate a dashboard visualization associated with one or more edge devices, the request comprising:
a categorization of one or more of the one or more edge devices; and
at least one operational descriptor; and in response to the request:
processing the voice input, wherein processing the voice input comprises:
converting the categorization of the voice input into a first text string and the at least one operational descriptor of the voice input into a second text string;
determining one or more attribute tags associated with the voice input by querying a natural language database using at least one of the first text string or the second text string; and
performing, using at least one of the one or more attribute tags, a natural language query to obtain aggregated data from a centralized control database;
determining a status associated with the one or more edge devices for the aggregated data;
configuring the dashboard visualization to a remote-control format such that the dashboard visualization is configured to remotely control a first edge device of the one or more edge devices and enable real-time collaboration with a remote computing device; and
providing the dashboard visualization to an electronic interface of a computing device, the dashboard visualization comprising the status associated with the one or more edge devices.

14. The method of claim 13, wherein one or more of the one or more edge devices that generates the obtained aggregated data is capable of encrypting the obtained aggregated data.

15. The method of claim 13, further comprising:
determine a list of prioritized actions for the one or more edge devices based on the status; and
provide the list of prioritized actions to a user via the dashboard visualization.

16. The method of claim 15, further comprising:
grouping prioritized actions for the one or more edge devices based on relationships between the aggregated data; and
configuring the dashboard visualization based on the grouping of the prioritized actions for the one or more edge devices.

17. A system comprising:
at least one warehouse, each at least one warehouse including a one or more edge devices configured to access a network; and
a computing device comprising:
a display;
one or more processors;
a memory including one or more programs stored therein, which, when executed by the one or more processors, cause the computing device to:
receive a voice input, wherein the voice input comprises a request to generate a dashboard visualization associated with the one or more edge devices, the request comprising a categorization of the one or more edge devices and at least one operational descriptor;

process the voice input wherein processing the voice input comprises:
  converting the categorization of the voice input into a first text string and the at least one operational descriptor of the voice input into a second text string;
  determining one or more attribute tags associated with the voice input by querying a natural language database using at least one of the first text string or the second text string; and
  performing, using at least one of the one or more attribute tags, a natural language query to obtain aggregated data from a centralized control database;
determine prioritized actions associated with the one or more edge devices for the aggregated data;
configure the dashboard visualization to a remote-control format such that the dashboard visualization is configured to remotely control a first edge device of the one or more edge devices and enable real-time collaboration with a remote computing device;
provide the dashboard visualization to the display, the dashboard visualization comprising the prioritized actions associated with a portfolio of assets,
determine a list of prioritized actions for the one or more edge devices based on a status; and
optimize the status of the one or more edge devices based on the determined list of prioritized actions, wherein the visualization is based on one or more of:
the categorization of one or more of the edge devices; and
the at least one operational descriptor.

* * * * *